United States Patent
Moustafa et al.

(10) Patent No.: US 9,554,305 B2
(45) Date of Patent: Jan. 24, 2017

(54) USER EQUIPMENT, PORT CONTROL PROTOCOL SERVER, AND METHODS FOR SIGNALING DEVICE AND APPLICATION FEEDBACK

(71) Applicant: Intel IP Corporation, Santa Clara, CA (US)

(72) Inventors: Hassnaa Moustafa, Portland, OR (US); Danny Moses, Reut (IL); Jeffery R. Foerster, Portland, OR (US); Muthaiah Venkatachalam, Beaverton, OR (US); Vallabhajosyula S. Somayazulu, Portland, OR (US); Wu-Chi Feng, Tigard, OR (US); Meghashree Dattatri Kedalagudde, Hillsboro, OR (US); Kathiravetpillai Sivanesan, Richardson, TX (US); Rath Vannithamby, Portland, OR (US); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/659,655

(22) Filed: Mar. 17, 2015

(65) Prior Publication Data

US 2015/0195750 A1 Jul. 9, 2015

Related U.S. Application Data

(62) Division of application No. 14/279,562, filed on May 16, 2014.

(Continued)

(51) Int. Cl.
*H04W 4/00* (2009.01)
*H04W 36/00* (2009.01)
(Continued)

(52) U.S. Cl.
CPC .......... *H04W 36/0016* (2013.01); *H04L 65/60* (2013.01); *H04N 7/147* (2013.01); *H04W 36/0055* (2013.01); *H04W 74/0833* (2013.01)

(58) Field of Classification Search
None
See application file for complete search history.

(56) References Cited

U.S. PATENT DOCUMENTS

2003/0013443 A1   1/2003   Willars et al.
2007/0291733 A1   12/2007  Doran et al.
(Continued)

FOREIGN PATENT DOCUMENTS

KR   1020090124788 A   12/2009
KR   1020110038571 A   4/2011
(Continued)

OTHER PUBLICATIONS

"[Draft] LS on KeNB* generation in case of MFBI", R2-131153, 3GPP TSG RAN WG2 Meeting #80 bis, (May 24, 2013), 1 pg.
(Continued)

*Primary Examiner* — Anh-Vu Ly
(74) *Attorney, Agent, or Firm* — Schwegman Lundberg & Woessner, P.A.

(57) ABSTRACT

Embodiments of User Equipment (UE) and methods to support reception of content for use by an application supported by a Port Control Protocol (PCP) client are disclosed herein. The UE may receive, from a PCP server, a first portion of video content for use by the application during a first time period. The UE may send a PCP update message that includes one or more mobility status parameters. The UE may receive a second portion of the video content for use by the application during a second time period. The first and second portions of the video content may be received from a first and a second mobility anchor, which may operate as relays for the PCP server. The second mobility anchor may be determined based on a referred IP prefix included in the PCP date update message.

15 Claims, 17 Drawing Sheets

Related U.S. Application Data

(60) Provisional application No. 61/898,425, filed on Oct. 31, 2013, provisional application No. 61/879,014, filed on Sep. 17, 2013.

(51) Int. Cl.
  *H04W 74/08* (2009.01)
  *H04L 29/06* (2006.01)
  *H04N 7/14* (2006.01)

(56) References Cited

U.S. PATENT DOCUMENTS

| | | | |
|---|---|---|---|
| 2008/0080428 | A1 | 4/2008 | Jappila et al. |
| 2008/0205379 | A1 | 8/2008 | Naqvi |
| 2009/0016249 | A1 | 1/2009 | Li et al. |
| 2009/0270098 | A1 | 10/2009 | Gallagher et al. |
| 2011/0080825 | A1 | 4/2011 | Dimou et al. |
| 2011/0164562 | A1* | 7/2011 | Qiu .................. H04W 72/1236 370/328 |
| 2011/0280212 | A1 | 11/2011 | Lv |
| 2012/0020291 | A1 | 1/2012 | Nasielski et al. |
| 2012/0063298 | A1 | 3/2012 | Yi et al. |
| 2012/0088498 | A1 | 4/2012 | Xiao et al. |
| 2012/0202557 | A1 | 8/2012 | Olofsson et al. |
| 2012/0218970 | A1* | 8/2012 | Westberg ................ H04L 67/28 370/331 |
| 2012/0236776 | A1* | 9/2012 | Zhang .................. H04W 48/12 370/312 |
| 2012/0276897 | A1 | 11/2012 | Kwon et al. |
| 2012/0327821 | A1 | 12/2012 | Lin et al. |
| 2013/0022023 | A1 | 1/2013 | Aydin |
| 2013/0023269 | A1 | 1/2013 | Wang et al. |
| 2013/0044690 | A1 | 2/2013 | Shaheen |
| 2013/0051507 | A1 | 2/2013 | Jantunen et al. |
| 2013/0109301 | A1 | 5/2013 | Hakola et al. |
| 2013/0121249 | A1 | 5/2013 | Ji et al. |
| 2013/0183963 | A1 | 7/2013 | Turtinen et al. |
| 2013/0183974 | A1 | 7/2013 | Johansson et al. |
| 2013/0332559 | A1* | 12/2013 | Mas Ivars .......... H04L 61/1511 709/216 |
| 2014/0148174 | A1 | 5/2014 | Teyeb et al. |
| 2015/0078335 | A1 | 3/2015 | Sivanesan et al. |
| 2015/0117183 | A1 | 4/2015 | Heo et al. |
| 2015/0207672 | A1 | 7/2015 | Xu et al. |

FOREIGN PATENT DOCUMENTS

| | | |
|---|---|---|
| WO | WO-2012150815 A2 | 11/2012 |
| WO | WO-2012159270 A1 | 11/2012 |
| WO | WO-2015042100 A1 | 3/2015 |
| WO | WO-2015065619 A1 | 5/2015 |
| WO | WO-2015065768 A1 | 5/2015 |
| WO | WO-2015065881 A1 | 5/2015 |
| WO | WO-2015065947 A1 | 5/2015 |
| WO | WO-2015066281 A1 | 5/2015 |
| WO | WO-2015066476 A1 | 5/2015 |

OTHER PUBLICATIONS

"U.S. Appl. No. 14/279,562, Notice of Allowance mailed Sep. 4, 2015", 9 pgs.

"Comparison of the UP Alternatives", R2-132338, 3GPP TSG-RAN WG2 Meeting #83, Barcelona, Spain, NSN, Nokia Corporation, NTT DOCOMO, Inc., Samsung, (Aug. 2013), 5 pgs.

"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.

"Discussion on Multi-level Prach Coverage Enhancement", R1-140616 3GPP TSG RAN WG1 Meeting #76 NTT DOCOMO, (Feb. 2014), 1-6.

"Further considerations on MTC coverage enhancement", Motorola Mobility, RI-132467, 3GPP TSG RAN WG1 Meeting #73, Fukuoka, Japan, (May 20-24, 2013), 1-3.

"Further discussion on resource allocation for D2D discovery", R1-134116 3GPP TSG RAN WG1 Meeting #74bis CATT, (Oct. 11, 2013), 1-6.

"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.

"Inter-corresponding sets of resources for D2D discovery", R1-134365 3GPP TSG RAN WG1 Meeting #74bis HTC, (Oct. 11, 2013), 1-2.

"International Application Serial No. PCT/US2014/050214, International Search Report mailed Nov. 19, 2014", 4 pgs.

"International Application Serial No. PCT/US2014/050214, Written Opinion mailed Nov. 19, 2014", 5 pgs.

"International Application Serial No. PCT/US2014/056003, International Search Report mailed Dec. 16, 2014", 4 pgs.

"International Application Serial No. PCT/US2014/056003, Written Opinion mailed Dec. 16, 2014", 5 pgs.

"International Application Serial No. PCT/US2014/056909, International Search Report mailed Dec. 26, 2014", 3 pgs.

"International Application Serial No. PCT/US2014/056909, Written Opinion mailed Dec. 26, 2014", 4 pgs.

"International Application Serial No. PCT/US2014/061569, International Search Report mailed Jan. 16, 2015", 3 pgs.

"International Application Serial No. PCT/US2014/061569, Written Opinion mailed Jan. 16, 2015," 6 pgs.

"International Application Serial No. PCT/US2014/062349, International Search Report mailed Jan. 26, 2015", 4 pgs.

"International Application Serial No. PCT/US2014/062349, Written Opinion mailed Jan. 26, 2015", 8 pgs.

"International Application Serial No. PCT/US2014/062533, International Search Report mailed Jan. 21, 2015", 3 pgs.

"International Application Serial No. PCT/US2014/062533, Written Opinion mailed Jan. 21, 2015", 6 pgs.

"International Application Serial No. PCT/US2014/063080, International Search Report mailed Feb. 12, 2015", 4 pgs.

"International Application Serial No. PCT/US2014/063080, Written Opinion mailed Feb. 12, 2015", 5 pgs.

"International Application Serial No. PCT/US2014/063434, International Search Report mailed Feb. 16, 2015", 4 pgs.

"International Application Serial No. PCT/US2014/063434, Written Opinion mailed Feb. 16, 2015", 8 pgs.

"LS on signalling of multiple frequency band indicators; prioritization of frequency bands supported", R2-122009, 3GPP TSG RAN WG2 Meeting #78 Ericsson, (May 25, 2012), 1 pg.

"On MFBI and EARFCN extension", GP-130431 3GPP TSG Geran#58 Renesas Mobile Europe Ltd.,, (May 2013), 1-5 pgs.

"On Resource Allocation and System Operation for D2D Discovery", R1-135119 3GPP TSG RAN WG1 Meeting #75 Intel Corporation, (Nov. 15, 2013), 1-6.

"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WGI_RL1/TSGRI_72b/Docs/R1-131397.zip>, (Apr. 15-19, 2013).

"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WG1_RL1/TSGRI_73/Docs/R1-32256.zip>, (May 20-24, 2013), 1-3.

"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WGI_RLI/TSGRI_72b/Docs/R1-130982.zip>, (Apr. 15-19, 2013), 1-4.

"Physical Random Access Channel Coverage Enhancement", R1-134303 TSG RAN WG1 Meeting #74bis, Guangzhou, China ZTE, (Sep. 28, 2013), 1-16.

"PRACH coverage enhancement for MTC UEs", R1-140278 3GPP TSG RAN WG1 Meeting #76 ZTE, (Feb. 2014), 1-8.

(56) References Cited

OTHER PUBLICATIONS

"PRACH resource multiplexing to support low cost MTC and coverage enhancement", R1-140027 3GPP TSG RAN WG1 Meeting #76, (Feb. 2014), 1-6.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
U.S. Appl. No. 14/491,639, filed Sep. 19, 2014, Radio Link Failure Handling for Dual Connectivity.
U.S. Appl. No. 14/279,562, filed May 16, 2014, User Equipment and Methods for Fast Handover Failure Recovery in 3GPP LTE Network.

* cited by examiner

USER EQUIPMENT, PORT CONTROL PROTOCOL SERVER, AND METHODS FOR SIGNALING DEVICE AND APPLICATION FEEDBACK

PRIORITY CLAIMS

This application is a divisional of U.S. patent application Ser. No. 14/279,562, filed May 16, 2014, which claims the benefit of priority under 35 U.S.C. 119(e) to U.S. Provisional Patent Application Ser. No. 61/879,014, filed Sep. 17, 2013 and to U.S. Provisional Patent Application Ser. No. 61/898,425, filed Oct. 31, 2013, each of which is incorporated herein by reference in its entirety.

TECHNICAL FIELD

Embodiments pertain to wireless cellular communications. Some embodiments relate to cellular communication networks including 3GPP (Third Generation Partnership Project) networks, 3GPP LTE (Long Term Evolution) networks, and 3GPP LTE-A (LTE Advanced), although the scope of the embodiments is not limited in this respect. Some embodiments relate to device contextual feedback. Some embodiments relate to multimedia applications, such as video applications. Some embodiments relate to Port Control Protocol (PCP) servers and clients.

BACKGROUND

When a mobile device (e.g., cell phone, UE) with an active or ongoing communication connection (e.g., voice or data call) is moving away from the coverage area of a first cell and entering the coverage area of a second cell, the communication connection is transferred to the second cell (target cell) in order to avoid link termination when the device gets out of coverage of the first cell (source cell). This "transfer of a connection" is termed handover or handoff. There may also be other reasons for performing a handover, such as load balancing.

In cellular networks, particularly 3GPP LTE heterogeneous networks, handover is becoming increasingly important for device mobility, particularly with the increasing use smaller cells and coverage areas overlaid with smaller cells. Some new use cases that are currently under discussion in 3GPP's RAN working groups (WGs) are dealing with "small-cell enhancements". The concept of small-cell enhancements involves deployment of additional low-power nodes under the macro-layer coverage for capacity extension and coverage improvement purposes. In small-cell enhancement situations, devices need to be handed over between these smaller and larger cells.

One issue with handover is handover failure. Handover failure may occur during certain conditions, such as when a device is undergoing radio-link failure. When handover failure occurs, service interruption may occur. This service interruption may be unsuitable for many applications.

Thus, there are general needs for techniques to reduce handover failure. There are general needs for techniques to reduce the service interruption time resulting during handover failure. There are also general needs for improved handover techniques that reduce handover failure with small-cell enhancements.

User Equipment (UE) operating in a cellular network may receive content for use in video and other multimedia applications at the device. Transmission of such content may demand a substantial amount of throughput, and the network may experience heavy loading when many devices simultaneously operate these types of applications. Accordingly, the limited throughput supportable by the network may need to be allocated carefully for those multiple devices. As a result, overall performance of the network may be improved in some cases, and thus there are general needs for systems and methods for allocating resources in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
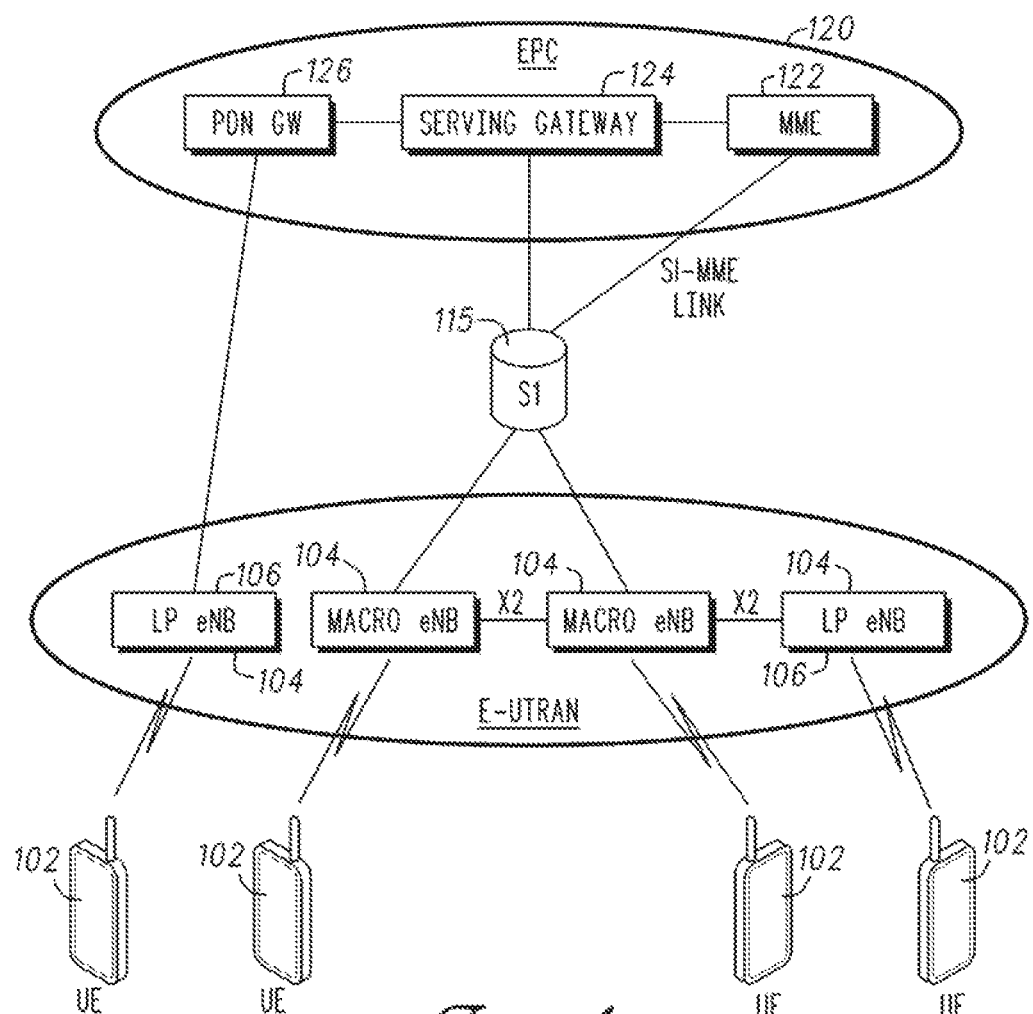
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network 100 comprises a radio access network (RAN) 100 (e.g., as depicted, the E-UTRAN or evolved universal terrestrial radio access network) and the core network 120 (e.g., shown as an evolved packet core (EPC)) coupled together through an S1 interface 115. For convenience and brevity sake, only a portion of the core network 120, as well as the RAN 100, is shown. The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with user equipment (UE) 102. The eNBs 104 may include macro eNBs and low power (LP) eNBs 106.

In accordance with some embodiments, UEs 102 may be arranged for fast handover failure recovery. In these embodiments, a UE 102 may be configured to initiate handover (HO) failure recovery by early transmission of a random-access channel (RACH) 2 message. In some embodiments, the early transmission of the RACH 2 message may occur when both a radio-link failure (RLF) timer (T310) and a time-to trigger (TTT) timer are concurrently running. The RACH 2 message is a message transmitted on a random-access channel for radio-resource control (RRC) connection re-establishment. The RLF timer may be activated during radio-link failure as part of a radio-link monitoring (RLM) process and the TTT timer may be activated as part of a handover process. In these embodiments, HO failures that occur when a UE 102 experiences radio-link failure may be significantly reduced. Rather than waiting to transmit a RACH 2 message until after HO failure as part of the RLM process, embodiments disclosed herein provide for an early transmission of the RACH 2 message to initiate handover (i.e., transmission of the RACH 2 message with both the RLF timer and TTT timer are running and prior to the expiration of the RLF timer). In some embodiments, this may be the earliest possible RACH opportunity. These embodiments may help prepare a target cell for handover of the UE 102 and may reduce and/or eliminate service interruption time. These embodiments are discussed in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to a user's broadband line. Once plugged in, the femtocell connects to the mobile operator's mobile network and provides extra coverage in a range of typically 30 to 50 meters for residential femtocells. Thus, a LP eNB (e.g., such as eNBs 106) might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a physical downlink shared channel (PDSCH) may carry user data and higher-layer signaling to a UE 102. A physical downlink control channel (PDCCH) may carry information about the transport format and resource allocations related to the PDSCH channel, among other things. It also informs a UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
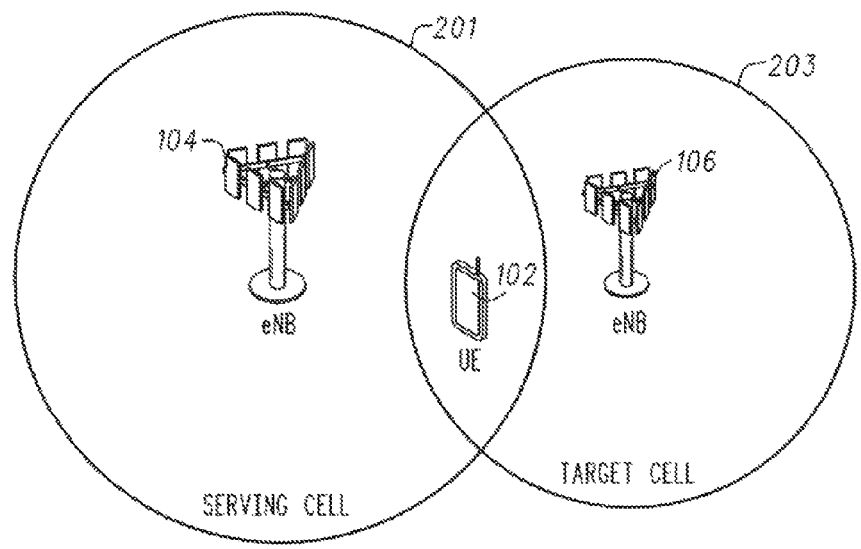
FIG. 2 illustrates handover of user equipment (UE) from a serving cell to a target cell in accordance with some embodiments.

FIG. 2 illustrates handover of a UE from a serving cell to a target cell in accordance with some embodiments. As illustrated in FIG. 2, an eNB 104 provides wireless communication services to communication devices, such as UE 102, within cell 201. The eNB 106 provides wireless communication services to communication devices within cell 203. The eNB 106 may be a lower power eNB, although the scope of the embodiments is not limited in this respect. A handover may be performed from eNB 104 to eNB 106 to handover communications with the UE 102 from a serving cell, such as cell 201 to a target cell, such as cell 203 as part of a handover process when certain handover criterion are met. These embodiments are described in more detail below.

Figure 3:
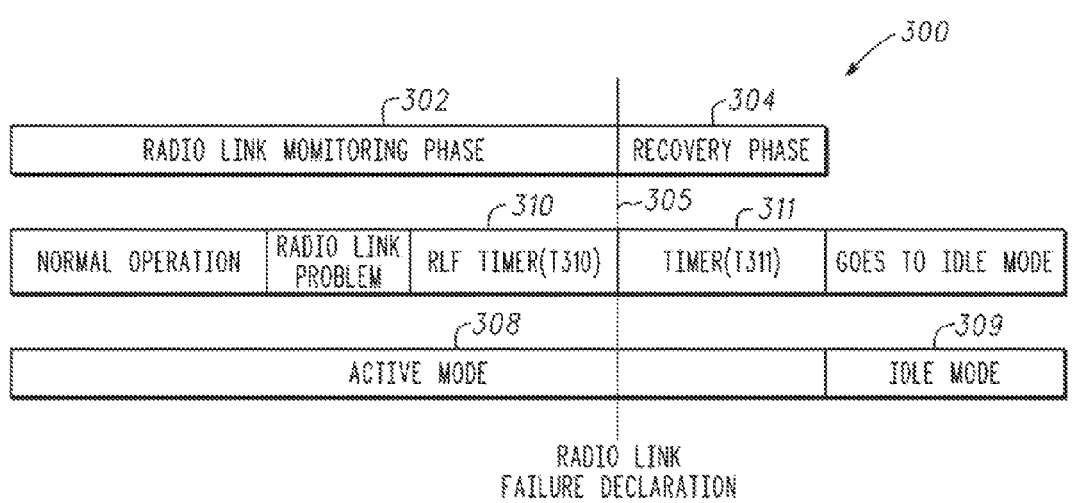
FIG. 3 illustrates a radio-link monitoring (RLM) process in accordance with some embodiments.

FIG. 3 illustrates a radio-link monitoring (RLM) process 300 in accordance with some embodiments. During the RLM process 300, a UE, such as UE 102, monitors the radio link during radio-link monitoring phase 302. In some embodiments, if an average wideband channel quality indicator (CQI) over a 200 ms time period goes below a threshold (e.g., Qout), an out-of-sync condition indication may be reported to the upper layers of the UE 102. If N310 times consequent out-of-sync condition indications are received by the upper layers, then the RLF timer (T310) 310 is started (i.e., activated). If the average wideband CQI over 100 ms goes above the threshold (e.g., Qin) and N311 times in-sync indications are reported before the RLF timer 310 expires, the RLF timer 310 is stopped and the radio link may be recovered. If the RLF timer 310 expires, a radio-link failure 305 may be declared and the UE 102 may enter the recovery phase 304 during which the RRC connection reestablishment procedure (resumption of SRB1 and activation of security) and a connection-reestablishment timer (T311) 311 are started. The RRC connection reestablishment procedure may succeed, for example, when the context of the UE 102 is available at a target cell 203. If connection reestablishment is successful, the connection-reestablishment timer T311 is stopped and the UE 102 may remain in active mode 308. If connection reestablishment is not successful, timer T311 may expire and the UE 102 may go into idle mode 309. Connection reestablishment may include cell selection. As discussed in more detail below, in accordance with embodiments, the UE 102 may be arranged for fast handover failure recovery by early transmission of a RACH 2 message when both the RLF timer (T310) 310 and a TTT timer are concurrently running.

Figure 4:
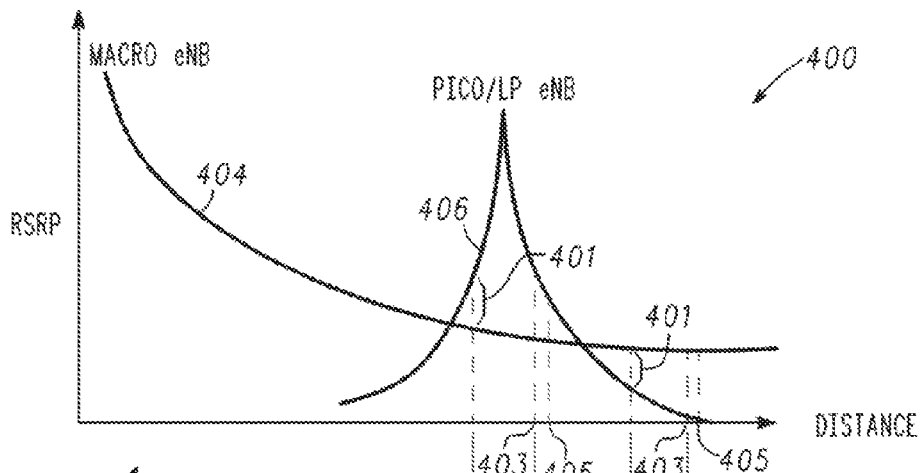
FIG. 4 illustrates a handover process in accordance with some embodiments.

FIG. 4 illustrates a handover process 400 in accordance with some embodiments. The handover process 400 may be initiated when a UE, such as UE 102 (FIG. 1), is moving into a coverage area of another cell (i.e., cell 203 (FIG. 2)). In some embodiments, the handover process 400 may be governed by certain events (e.g., Events 1, 2, 3, and/or 4 as defined in one of the 3GPP LTE standards) which may be based on a reference signal received power (RSRP) or a reference signal received quality (RSRQ). For example, the UE 102 may periodically measure the RSRP of neighboring cells. When the entering condition of an Event is satisfied (i.e., the Event is triggered), the handover process may be started. The RSRP based Event A3 is may be used for the 3GPP LTE handover process. The parameters that govern the HO process (Event A3) are a time-to-trigger (TTT), an A3 offset, a hysteresis, cell specific offsets (Ocn), and a frequency specific offset (Ofn). In the example illustrated in FIG. 4, when the RSRP 406 of a target cell goes above the RSRP 404 of serving cell by a threshold 401, the HO process may be initiated. The UE 102 may wait for a TTT period 402 (by starting the TTT timer) to send a measurement report at time 403 to the serving cell. The serving cell prepares the target cell via the X2 interface 115 (see FIG. 1) and may send a HO command to the UE 102 at time 405. The UE 102 may perform a contention (target not prepared) or non-contention (target prepared) based random access with the target cell by sending a RACH 2 message. As discussed in more detail below, in accordance with embodiments, the UE 102 may be arranged for fast handover failure recovery by early transmission of the RACH 2 message when both the RLF timer 310 (T310) and a TTT timer are concurrently running. In these embodiments, the RACH 2 message is transmitted when the RLF timer 310 and the TTT timer are both active and before (prior to) the RLF timer 310 or the TTT timer expires. This is unlike conventional techniques in which HO failure recovery is initiated by sending a RACH 2 message after HO failure occurs when the connection reestablishment timer 311 (i.e., timer T311) has already been activated.

Figure 5:
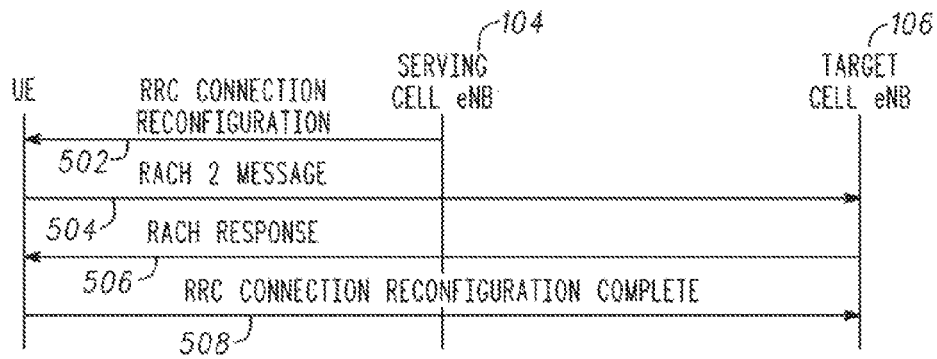
FIG. 5 illustrates non-contention based random access during handover in accordance with some embodiments.

FIG. 5 illustrates non-contention based random access during handover in accordance with some embodiments. In these embodiments, the UE 102 may receive an RRC connection reconfiguration message 502 from the serving cell eNB 104. The UE 102 may send a RACH 2 message 504 to the target cell eNB 106 (FIG. 1) as part of the handover process 300 (FIG. 3). When a RACH response message 506 is received from the target cell eNB 106, the UE 102 may send the RRC connection reconfiguration complete message 508 to the target cell since the target cell is prepared to accept the UE 102. As discussed in more detail below, in accordance with embodiments, the UE 102 may be arranged for fast handover failure recovery by early transmission of a RACH 2 message when both the RLF timer (T310) 310 and the TTT timer are concurrently running.

Conventionally, HO failure occurs when any one of the following happens:
The UL grant for the measurement report is lost;
The measurement report from the UE is lost;
The HO command from serving cell is lost;
The RACH message to target cell is lost.

Figure 7A:
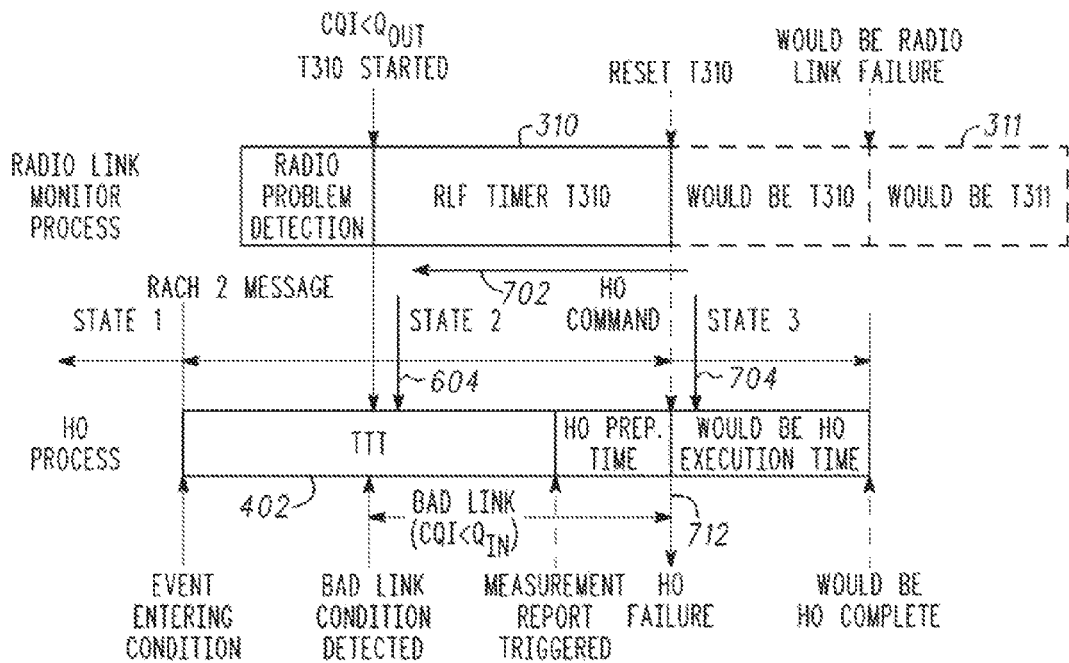
FIGS. 7A and 7B illustrate early transmission of a RACH 2 message in accordance with some embodiments in comparison with a conventional transmission of a RACH 2 message.
Figure 7B:
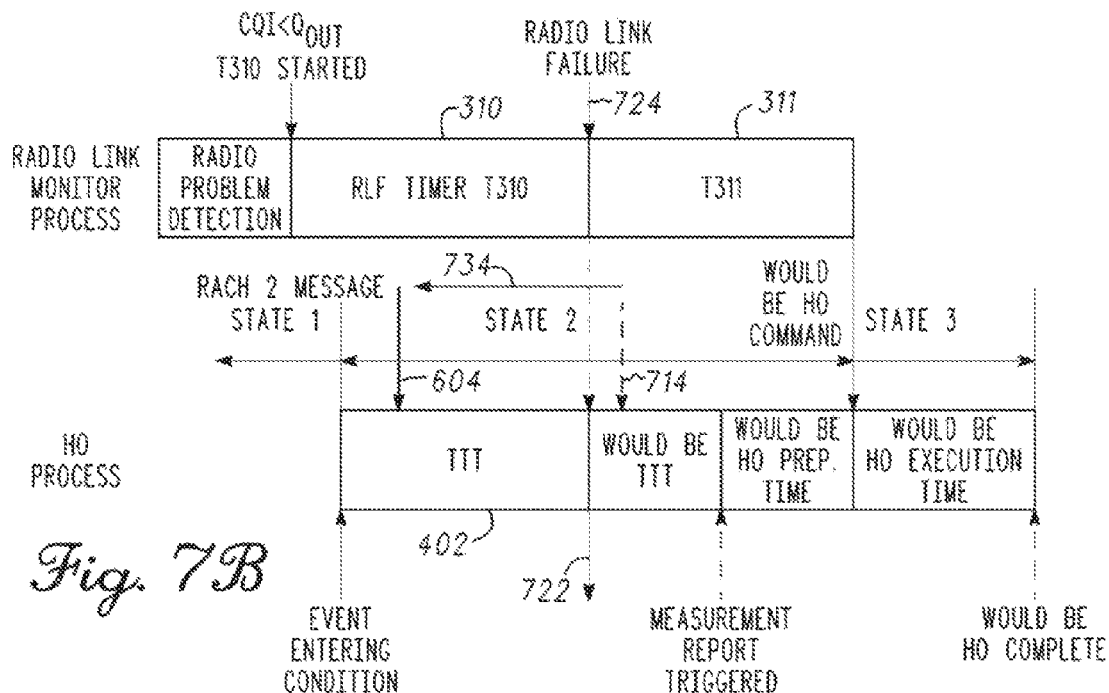

These failures may occur due to lower RSRP values from the serving or target cells and may occur during radio link failure. After HO failure, the UE 102 may have to start the network entry process by sending a RACH message to the strongest cell. "The HO command lost" may be the largest contributor towards the overall HO failure rate in an LTE network. Depending on the TTT and RLF (T310) timer expiry there are two failure scenarios: 1) when TTT timer expires while the RLF timer is running; and 2) when the RLF timer expires while the TTT timer is running. These scenarios are illustrated in FIGS. 7A and 7B described in more detail below.

One issue with these conventional techniques is that the recovery from RLF or HO failure starts after HO failure by initiating a network re-entry process at the UE. This results in a longer service interruption and larger latency or delay. Embodiments disclosed herein address these issues by transmitting RACH messages at the earliest possible instant when the RLF timer (T310) and TTT timer are overlapping. The RACH messages may be contention based or non-contention based depending on the intended cell. The target cell or another cell would be prepared early and recovery from handover failure and/or RLF may be faster than with conventional techniques. If HO failure or RLF does not actually occur, the cells and UE 102 may ignore the RACH message and the follow up messages.

Figures 6A, 6B:
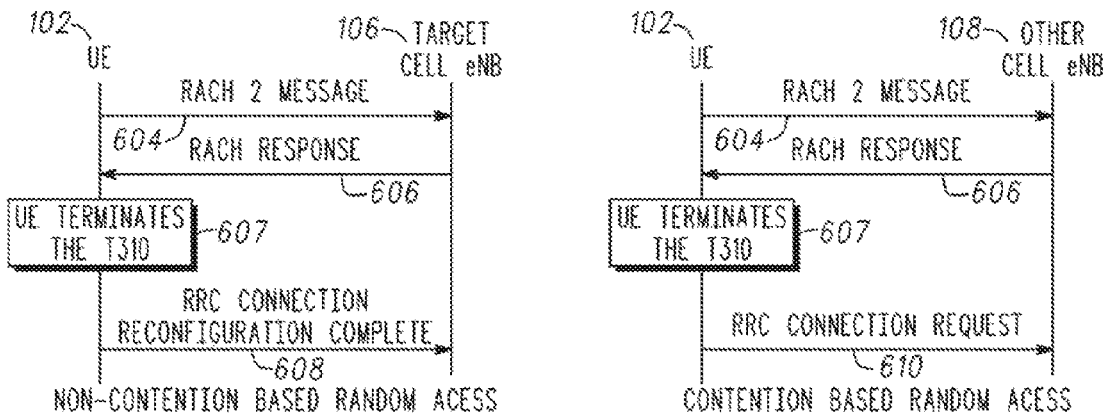
FIGS. 6A and 6B illustrate early transmission of a random-access channel (RACH) 2 message and early termination of a radio-link failure (RLF) timer (T310) in accordance with some embodiments.

FIGS. 6A and 6B illustrate early transmission of a random-access channel (RACH) 2 message and early termination of a radio-link failure (RLF) timer (T310) in accordance with some embodiments. As illustrated in FIGS. 6A and 6B, a UE, such as UE 102, may initiate HO failure recovery by transmission of RACH 2 message 604 when both the RLF timer (T310) 310 (FIG. 3) and the TTT timer are concurrently running. In these embodiments, the RACH 2 message 604 is a message transmitted on a random-access channel for RRC connection re-establishment.

In accordance with these embodiments, the UE 102 may activate (i.e., set/start) the RLF timer (T310) as part of RLM process 300 (FIG. 3) based on radio-link conditions with a serving cell 201. The UE 102 may activate the TTT timer as part of a HO process 400 (FIG. 4) based on a measurement reporting event (e.g., Event A3 based on a difference between predetermined reference signals 301 of the serving cell 201 and a target cell 203). The UE 102 may determine when both the RLF timer 310 and the TTT timer are active (i.e., concurrently running) to initiate the HO failure recovery by transmission of the RACH 2 message 604.

In these embodiments, in response to receipt of a RACH response message 606, the UE 102 may terminate the RLF timer (T310) at operation 607 (e.g., because channel conditions with an eNB are presumed to be good) and either transmit an RRC connection reconfiguration complete message 608 (FIG. 6A) to a target cell eNB 106 for non-contention based random access, or transmit a RRC connection request message 610 (FIG. 6B) to a third cell 108 that is neither the target or the serving cell for contention-based random access.

In some of these embodiments, the RRC connection reconfiguration complete message 608 may be sent to the target cell 106 since the cell would have the UE context since the UE 102 had already initiated the HO process. In these embodiments, a RRC connection request message 610 (i.e., rather than a RRC connection reconfiguration complete message 608) may be sent to a third cell 108 since the third cell 108 does not have the context of the UE 102. The third cell 108 may be arranged to retrieve context from the current serving cell and may send a RACH response.

In these embodiments, the RACH 2 message 604 may be transmitted when the RLF timer 310 and the TTT timer are both active and before (prior to) expiration of either the RLF timer 310 or the TTT timer. In these embodiments, the UE 102 may concurrently perform the HO process 400 and RLM process 300 as separate and independent processes. Conventional HO failure recovery, on the other hand, is initiated by sending a RACH 2 message after HO failure occurs when the connection reestablishment timer 311 (i.e., timer T311) is activated.

In these embodiments, the RLF timer 310 (timer T310) may be started when a UE detects physical-layer related problems (e.g., when the UE receives N310 consecutive out-of-sync indications from lower layers). The RLF timer 310 may be stopped, for example, 1) when the UE receives N311 consecutive in-sync indications from lower layers; 2) upon triggering the handover procedure; or 3) upon initiating the connection reestablishment procedure. At expiry of the RLF timer 310, a radio link failure 305 (FIG. 3) may be declared. The UE 102 may remain in active mode 308 (FIG. 3) initiate a connection reestablishment procedure (recovery phase 304) or the UE 102 may be arranged to enter RRC idle mode 309 if a connection was not reestablished, depending on whether security is activated.

In these embodiments, the connection-reestablishment timer 311 (i.e., timer T311) may be started while initiating a connection reestablishment during the recovery phase 304 and may be stopped upon selection of suitable E-UTRAN cell or a cell using another RAT. At expiry of the timer T311, the UE 102 may be arranged to enter RRC idle mode 309 since a connection had not been established with a suitable cell.

In some embodiments, the RACH 2 message 604 is an unscheduled message that is transmitted on the random-access channel. In these embodiments, the RACH 2 message 604 may initiate an RRC connection re-establishment procedure. In these embodiments, the RACH 2 message 604 may comprise a preamble sequence (e.g., one of 64 possible sequences) that may be decoded by an eNB to identify the UE 102. In some embodiments, the RACH 2 message may include a Random Access Radio Network Temporary Identifier (RA-RNTI) of the UE 102.

In accordance with some LTE embodiments, UE 102 may be arranged to transmit various RACH messages including: a RACH 1 message for initial access from RRC idle mode, the RACH 2 message for RRC connection re-establishment, a RACH 3 message for handover, a RACH 4 message for downlink data arrival during RRC connected mode requiring a random access procedure (e.g., when uplink synchronization status is "non-synchronized"), a RACH 5 message for uplink (UL) data arrival during RRC connected mode requiring random access procedure (e.g., when UL synchronization status is "non-synchronized" or there are no PUCCH resources for SR available), and a RACH 6 message for positioning purposes during RRC connected mode requiring a random access procedure (e.g., when timing advance is needed for UE positioning).

In some embodiments, when the UE 102 does not receive a RACH response message 606 and the RLF timer 310 has not reset as part of the RLM process 300 (e.g., because channel conditions do not improve), the UE 102 may continue to perform the RLM process 300 and perform a connection reestablishment procedure upon expiration of the RLF timer 310. In these embodiments, the RLM process 300 may include sending another RACH 2 message to either the same cell or a different cell for link recovery as part of a connection reestablishment procedure upon expiration of the RLF timer 310.

In some embodiments, when the RACH 2 message 604 is transmitted to initiate HO failure recovery (i.e., when both the RLF timer 310 and the TTT timer are active), the RACH 2 message 604 may be transmitted to an eNB of a cell having a greatest received signal strength (e.g., a greatest RSRP). When the eNB is associated with either the target cell 203 or the serving cell 201, the RACH 2 message 604 may be transmitted in accordance with a non-contention random-access based technique (see FIG. 6A). When the eNB is associated with neither the target cell 203 nor the serving cell 201, the RACH 2 message 604 may be transmitted in accordance with a contention-based random-access technique (see FIG. 6B).

In these embodiments, when the RACH 2 message 604 is sent to either the target cell 203 or the serving cell 201, the target cell 203 and the serving cell 201 may both already have context for the UE 102 allowing either the target cell 203 or the serving cell 201 to respond with the RACH response message 606. In these embodiments, when the RACH 2 message 604 was sent to a third cell that was neither the target cell 203 nor the serving cell 201, a non-contention based technique may be used when the third cell has context for the UE 102 (i.e., due to the RLF process) and a contention based technique may be used when the third cell does not have context for the UE 102.

In some embodiments, when the TTT timer is running and the RLF timer 310 is not running (i.e., the radio link is not experiencing failure or is in the recovery phase 304), the UE 102 may continue to perform the HO process 400 (FIG. 4) and send a RACH 2 message 504 (FIG. 5) to the target cell eNB 106 after receipt of a RRC reconfiguration message 502 (FIG. 5) from the serving cell eNB 104. In these embodiments, a RACH 2 message would not be sent early. In some embodiments, a RACH 3 message may be sent during normal handover operations (i.e., when the UE 102 is not experiencing radio-link failure).

In some embodiments, the UE 102 may initially set the RLF timer (T310) based on a CQI (e.g., the wideband CQI) associated with a radio link with the serving cell as part of the RLM process 300. The UE 102 may set the TTT timer upon satisfaction of a measurement reporting event (i.e., when an event is triggered). In some embodiments, the TTT timer may be set upon the satisfaction of Event A3, which is based a difference between the RSRP of the serving cell and the target cell (e.g., threshold 401 (FIG. 4)). In some embodiments, the value if the TTT timer may be set using a Report Configuration information element (IE), although the scope of the embodiments is not limited in this respect.

FIG. 7A illustrates the early transmission of a RACH 2 message 604 in comparison with a conventional transmission of a RACH 2 message 704 in the situation when the TTT timer expires while the RLF timer 310 is active. FIG. 7B illustrates the early transmission of a RACH 2 message 604 in comparison with a conventional transmission of a RACH 2 message 714 when the RLF timer 310 expires while the TTT timer is active.

As illustrated in FIG. 7A, HO failure would conventionally occur at time 712 since either the measurement report had not be received by the serving cell or the HO command may not have been received by the UE 102. This would result in the transmission of RACH 2 message 704 conventionally as illustrated. As illustrated in FIG. 7A, RACH 2 message 604 is transmitted earlier than RACH 2 message 704 by time 702 which may allow a target cell to prepare for handover earlier and reduce or eliminate service interruption. In these embodiments, the RACH process is started earlier so the RLF recovery could be achieved earlier. In FIGS. 7A and 7B, state 1 is the time period before handover measurement event is triggered or the TTT is triggered, state 2 is the time period from when the TTT is triggered and the time when handover failure occurs, and state 3 is the handover recovery period after handover failure.

As illustrated in FIG. 7B, HO failure would conventionally occur at time 722 due to radio link failure at time 724 and resulting in the subsequent transmission of the RACH 2 message 714. As illustrated in FIG. 7B, RACH 2 message 604 is transmitted earlier than RACH 2 message 714 by time 732 which may allow a target cell to prepare for handover earlier and reduce or eliminate service interruption. In these embodiments, the RACH process is started earlier so the RLF recovery could be achieved earlier.

Figure 8:
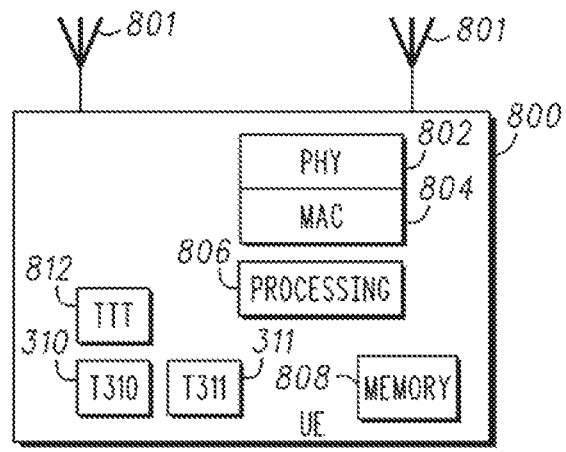
FIG. 8 illustrates a UE configured for early transmission of a RACH 2 message in accordance with some embodiments.

FIG. 8 illustrates a UE configured for early transmission of a RACH 2 message in accordance with some embodiments. UE 800 may be suitable for use as UE 102 (FIG. 1). The UE 800 may include physical layer circuitry (PHY) 802 for transmitting and receiving signals to and from eNBs 104 (FIG. 1) using one or more antennas 801. UE 800 may also include medium access control layer (MAC) circuitry 804 for controlling access to the wireless medium. UE 800 may also include processing circuitry 806 and memory 808 arranged to perform the operations described herein.

In accordance with some embodiments, the MAC circuitry 804 may be arranged to contend for a wireless medium configure frames or packets for communicating over the wireless medium and the PHY 802 may be arranged to transmit and receive signals. The PHY 802 may include circuitry for modulation/demodulation, upconversion/downconversion, filtering, amplification, etc. In some embodiments, the processing circuitry 806 may include one or more processors. In some embodiments, two or more antennas may be coupled to the physical layer circuitry arranged for sending and receiving signals. The memory 808 may be store information for configuring the processing circuitry 806 to perform the various operations described herein.

In accordance with embodiments, the UE 800 may also include a RLF timer 310, a TTT timer 812 and a connection-reestablishment timer 311 (e.g., T311). Processing circuitry 804 may be arranged to perform the RLM process 300 (FIG. 3) and the HO process 400 (FIG. 4). The processing circuitry 804 may also be configured to activate (i.e., set/start) the RLF timer 310 (T310) as part of the RLM process 300 based on radio-link conditions with a serving cell 201, and activate the TTT timer 812 as part of the HO process 400 based on a reporting event. The processing circuitry 804 may also be configured to determine when both the RLF timer and the TTT timer are active (i.e., concurrently running) to initiate the HO failure recovery by causing transmission of the RACH 2 message by the PHY 802.

In some embodiments, the UE 800 may be a mobile device and may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 800 may include one or more of a keyboard, a display, a non-volatile memory port, multiple antennas, a graphics processor, an application processor, speakers, and other mobile device elements. The display may be an LCD screen including a touch screen.

The antennas 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 9:
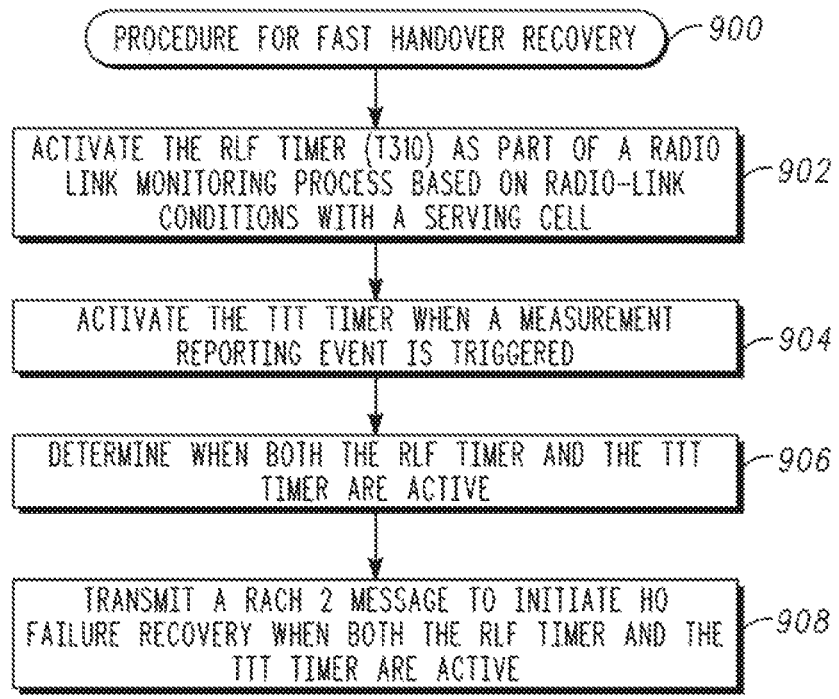
FIG. 9 illustrates a procedure for fast handover recovery in accordance with some embodiments.

FIG. 9 illustrates a procedure for fast handover recovery in accordance with some embodiments. Procedure 900 for fast handover recovery may be performed by a UE, such as UE 102 (FIG. 1) or UE 800 (FIG. 8).

In operation 902, the UE 102 may activate the RLF timer (T310) 310 (FIG. 8) as part of the RLM process 300 (FIG. 3) based on radio-link conditions with a serving cell 201.

In operation 904, the UE 102 may activate the TTT timer 812 (FIG. 8) as part of a HO process 400 (FIG. 4) based on a measurement reporting event (e.g., Event A3 based on a difference between predetermined reference signals 301 of the serving cell 201 and a target cell 103). The HO process 400 and RLM process 300 may be independent processes performed concurrently by the UE 102.

In operation 906, the UE 102 may determine when both the RLF timer 310 and the TTT timer 812 are active (i.e., concurrently running) to initiate the HO failure recovery.

In operation 907, the UE 102 may transmit a RACH 2 message to initiate HO failure recovery when it is determined that both the RLF timer 310 and the TTT timer 812 are active and before (prior to) expiration of either the RLF timer 310 or the TTT timer 812. This is unlike conventional techniques in which HO failure recovery is initiated by sending a RACH 2 message after HO failure occurs when the connection reestablishment timer 311 (i.e., timer T311) (FIG. 3) has already been activated.

Figure 10:
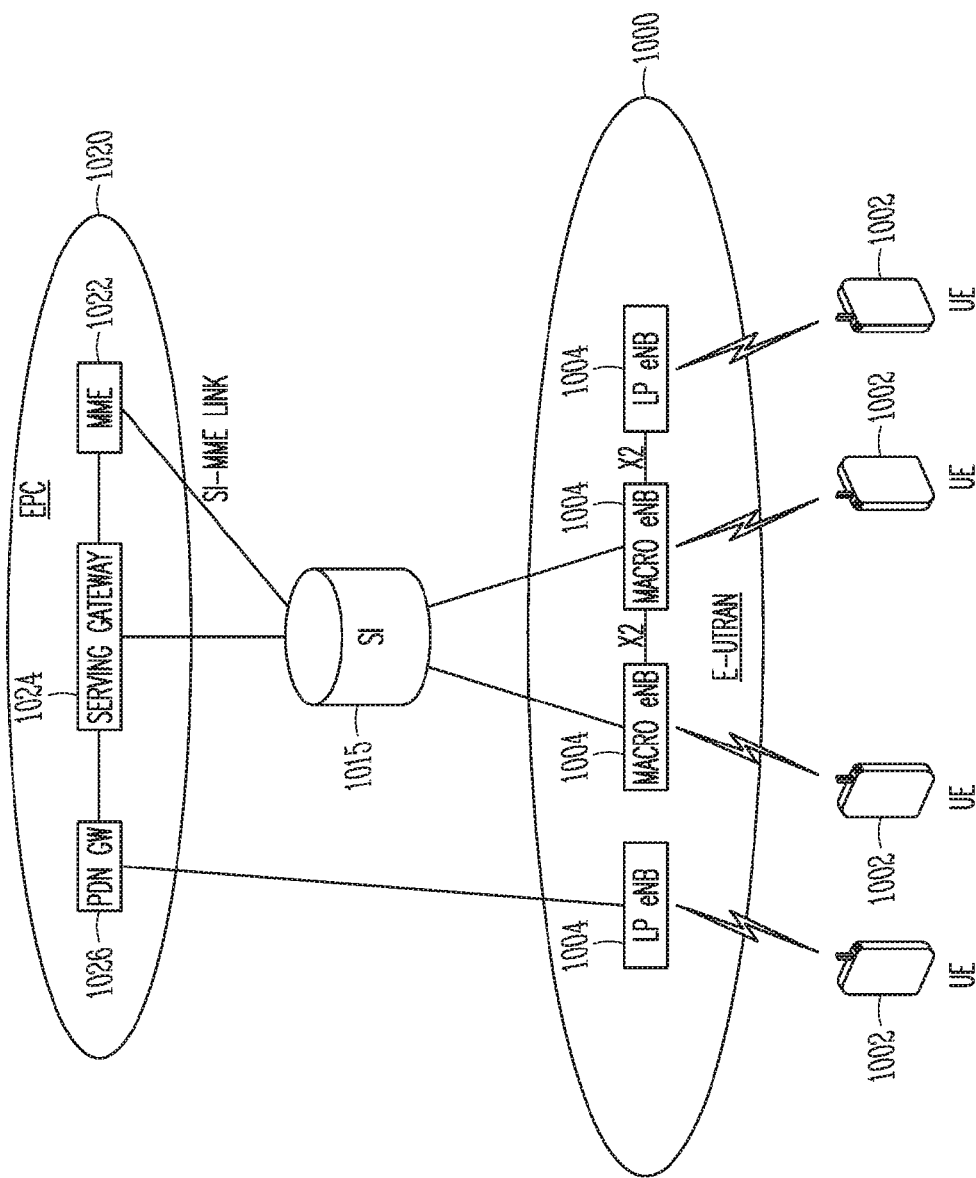
FIG. 10 is a functional diagram of a 3GPP network in accordance with some embodiments.

FIG. 10 is a functional diagram of a 3GPP network in accordance with some embodiments. The network comprises a radio access network (RAN) (e.g., as depicted, the E-UTRAN or evolved universal terrestrial radio access network) 1000 and the core network 1020 (e.g., shown as an evolved packet core (EPC)) coupled together through an S1 interface 1015. For convenience and brevity sake, only a portion of the core network 1020, as well as the RAN 1000, is shown.

The core network 1020 includes a mobility management entity (MME) 1022, a serving gateway (serving GW) 1024, and packet data network gateway (PDN GW) 1026. The RAN 1000 includes Evolved Node-B's (eNBs) 1004 (which may operate as base stations) for communicating with User Equipment (UE) 1002. The eNBs 1004 may include macro eNBs and low power (LP) eNBs. In accordance with some embodiments, the UE 1002 may receive, from the eNB 1004, application content that is based at least partly on one or more device operation parameters associated with the UE 1002.

The MME 1022 is similar in function to the control plane of legacy Serving GPRS Support Nodes (SGSN). The MME 1022 manages mobility aspects in access such as gateway selection and tracking area list management. The serving GW 102.4 terminates the interface toward the RAN 1000, and routes data packets between the RAN 1000 and the core network 1020. In addition, it may be a local mobility anchor point for inter-eNB handovers and also may provide an anchor for inter-3GPP mobility. Other responsibilities may include lawful intercept, charging, and some policy enforcement. The serving GW 1024 and the MME 1022 may be implemented in one physical node or separate physical nodes. The PDN GW 1026 terminates an SGi interface toward the packet data network (PDN). The PDN GW 1026 routes data packets between the EPC 1020 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 1026 and the serving GW 1024 may be implemented in one physical node or separated physical nodes.

The eNBs 1004 (macro and micro) terminate the air interface protocol and may be the first point of contact for a UE 1002. In some embodiments, an eNB 1004 may fulfill various logical functions for the RAN 1000 including but not limited to RNC (radio network controller functions) such as radio bearer management, uplink and downlink dynamic radio resource management and data packet scheduling, and mobility management. In accordance with embodiments, UEs 1002 may be configured to communicate OFDM communication signals with eNB 1004 over a multicarrier communication channel in accordance with an OFDMA communication technique. The OFDM signals may comprise a plurality of orthogonal subcarriers.

The S1 interface 1015 is the interface that separates the RAN 1000 and the EPC 1020. It is split into two parts: the S1-U, which carries traffic data between the eNBs 1004 and the serving GW 1024, and the S1-MME, which is a signaling interface between the eNBs 1004 and the MME 1022. The X2 interface is the interface between eNBs 1004. The X2 interface comprises two parts, the X2-C and X2-U. The X2-C is the control plane interface between the eNBs 1004, while the X2-U is the user plane interface between the eNBs 1004.

With cellular networks, LP cells (which may also be known as small cells) are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, 4 picocell or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 1026. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 1004 to a UE 1002, while uplink transmission from the UE 1002 to the eNB 1004 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 1002 (FIG. 10). The physical downlink control channel (PDCCH) carries information about the transport format and resource allocations related to the PDSCH channel, among other things. It also informs the UE 1002 about the transport format, resource allocation, and H-ARQ information related to the uplink shared channel. Typically, downlink scheduling (assigning control and shared channel resource blocks to UEs 1002 within a cell) is performed at the eNB 1004 based on channel quality information fed back from the UE 1002 to the eNB 1004, and then the downlink resource assignment information is sent to a UE 1002 on the control channel (PDCCH) used for (assigned to) the UE 1002.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 11:
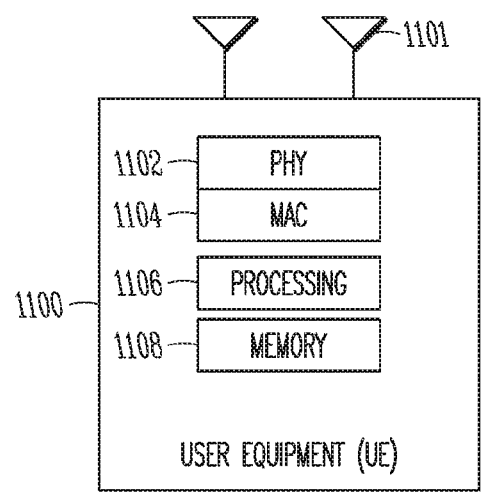
FIG. 11 is a functional diagram of a User Equipment (UE) in accordance with some embodiments.
Figure 12:
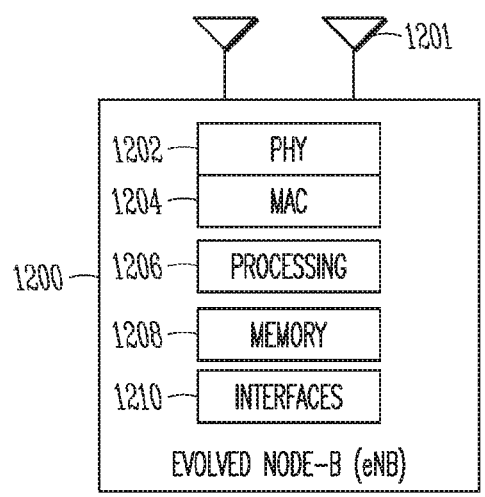
FIG. 12 is a functional diagram of an Evolved Node-B (eNB) in accordance with some embodiments.
Figure 13:
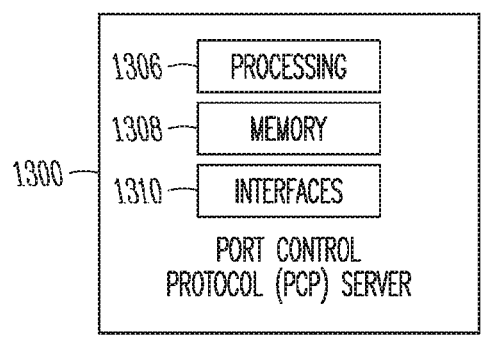
FIG. 13 is a functional diagram of a Port Control Protocol (PCP) server in accordance with some embodiments.

FIG. 11 is a functional diagram of a User Equipment (UE) in accordance with some embodiments. FIG. 12 is a functional diagram of an Evolved Node-B (eNB) in accordance with some embodiments. It should be noted that in some embodiments, the eNB 1200 may be a stationary non-mobile device. FIG. 13 is a functional diagram of a Port Control Protocol (PCP) server in accordance with some embodiments. The PCP server 1300 may be a standalone device, in some embodiments, but is not limited as such. In some embodiments, the PCP server 1300 may be included as part of one or more other components. As an example, the PCP server 1300 may be included in the eNB 1200. As another example, the eNB 1200 and/or other components may implement some or all of the functionality associated with the PCP server 1300 as described herein.

The UE 1100 may be suitable for use as a UE 1002 as depicted in FIG. 10, while the eNB 1200 may be suitable for use as an eNB 1004 as depicted in FIG. 10. The UE 1100 may include physical layer circuitry 1102 for transmitting and receiving signals to and from the eNB 1200, other eNBs, other UEs or other devices using one or more antennas 1101, while the eNB 1200 may include physical layer circuitry 1202 for transmitting and receiving signals to and from the UE 1100, other eNBs, other UEs or other devices using one or more antennas 1201. The UE 1100 may also include medium access control layer (MAC) circuitry 1104 for controlling access to the wireless medium, while the eNB 1200 may also include medium access control layer (MAC) circuitry 1204 for controlling access to the wireless medium. The UE 1100 may also include processing circuitry 1106 and memory 1108 arranged to perform the operations described herein. The eNB 1200 may also include processing circuitry 1206 and memory 1208 arranged to perform the operations described herein. The eNB 1200 may also include one or more interfaces 1210, which may enable communication with other components, including other eNBs 1004 (FIG. 10), components in the EPC 102.0 (FIG. 10) or other network components. The PCP server 1300 may also include processing circuitry 1306 and memory 1308 arranged to perform the operations described herein. The PCP server 1300 may also include one or more interfaces 1310, which may enable communication with other components, including eNBs 1004 (FIG. 10), components in the EPC 1020 (FIG. 10) or other network components. In addition, the interfaces 1210, 1310 may enable communication with other components that may not be shown in FIG. 10, including components external to the network. The interfaces 1210, 1310 may be wired or wireless or a combination thereof.

The antennas 1101, 1201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1101, 1201 may be effectively separated to take advantage of spatial diversity and the different channel characteristics that may result.

In some embodiments, the UE 1100 or the eNB 1200 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 1100 or eNB 1200 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 1100, eNB 1200 or other device may include one or more of a keyboard, a display, a non-volatile memory port, multiple antennas, a graphics processor, an application processor, speakers, and other mobile device elements. The display may be an LCD screen including a touch screen.

Although the UE 1100, eNB 1200, and PCP server 1300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 1002 may receive, from a PCP server 1300, a first portion of video content for use by an application during a first time period. The first portion may be formatted according to a first display format. The UE 1002 may send a PCP update message fir reception at the PCP server 1300. The PCP update message may include one or more device operation parameters associated with the UE 1002. The UE 1002 may further receive, from the PCP server 1300, a second portion of the video content for use by the application during a second time period. The second portion may be formatted according to a second display format, and the second display format may be based at least partly on the device operation parameters included in the PCP update message. These embodiments are described in more detail below.

Figure 14:
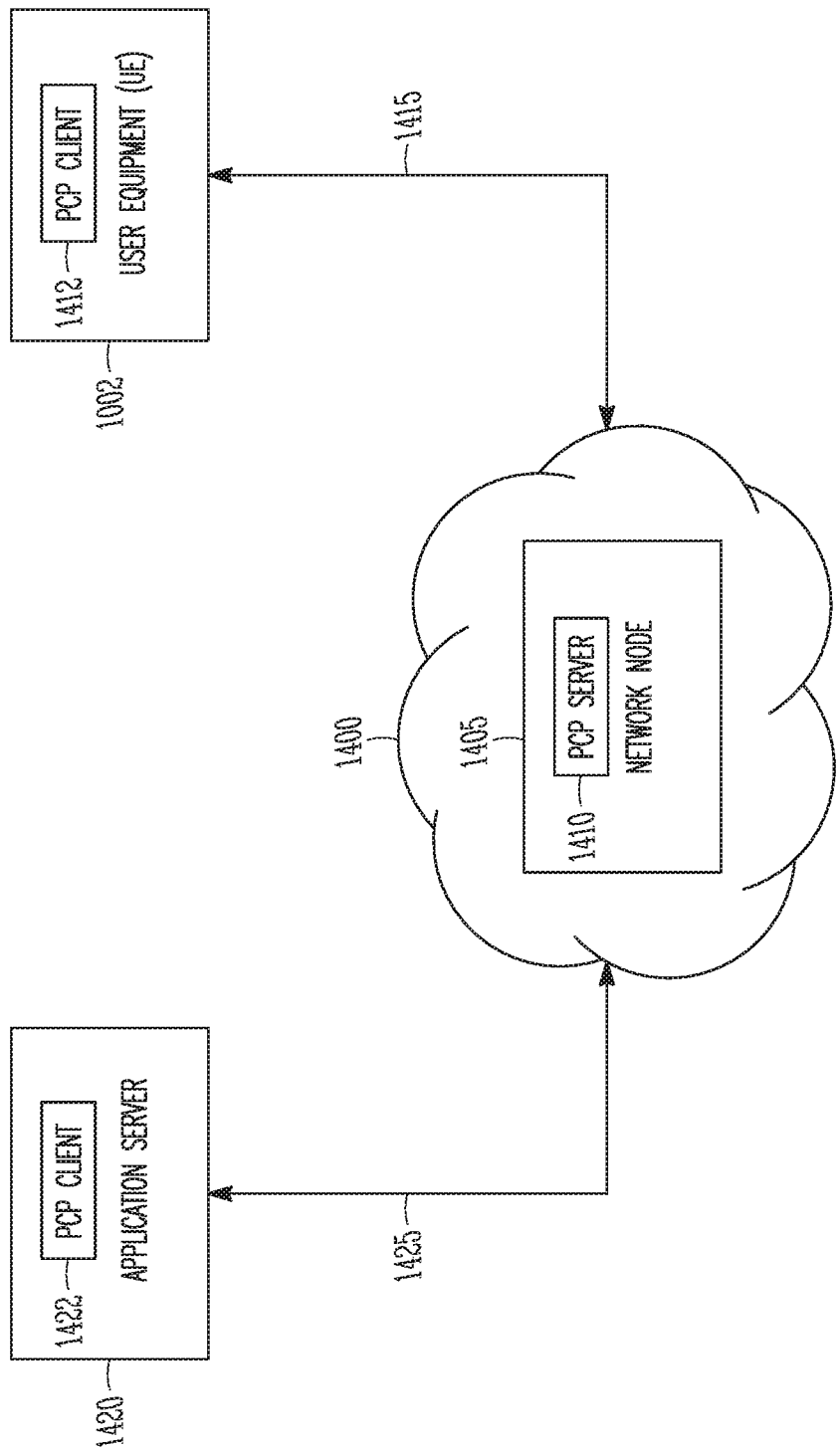
FIG. 14 illustrates an example of a scenario in which a UE receives content for a PCP client in accordance with some embodiments.

FIG. 14 illustrates an example of a scenario in which a UE 1002 may communicate with a network 1400 to receive content, data, voice or other information over the link 1415. The network 1400 may be or may be similar to the network 100, but is not so limited and may also be any suitable network that supports wireless and/or wired communication. In some embodiments, the content may be transmitted from the application server 1420 over the link 1425 for forwarding by the network 1400. It should be noted that the links 1415, 1425 may be wired or wireless or a combination thereof. Although content delivery may be performed using PCP, embodiments are not so limited and other suitable protocols may be used for this purpose.

The UE 1002 may include or may utilize a PCP client 1412 and the application server 1420 may utilize a PCP client 1422. The network 1400 may include a network node 1405 which may include or may utilize a PCP server 1410 for content delivery. In some embodiments, the PCP server 1410 may be or may be similar to the PCP server 1300 described earlier. It should be noted that the network node 1405 may be or may be part of an eNB 1004 or other base station, but is not so limited. In some embodiments, the PCP server 1410 may be a standalone component or may be included as part of a different component. As an example, the PCP server 1410 may be communicatively coupled to the network node 1405 or other component. In addition, in some embodiments, one or more components within or external to the network 1400 may be a PCP server 1410 or may provide related functionality. As an example, a streaming video service operating at a remote location may provide application content.

Port Control Protocol (PCP) may be or may include a request/response protocol and also a hint/notification protocol between PCP clients such as 1412, 1422 and the PCP server 1410. As an example, PCP may provide mapping information between internal Internet Protocol (IP) addresses and external IP addresses. As another example, PCP may be extended for mapping other information and/or addresses between internal and external components. PCP may be defined or configured as part of one or more Internet Engineering Task Force (IETF) standards or other standards, in some cases.

Figure 15:
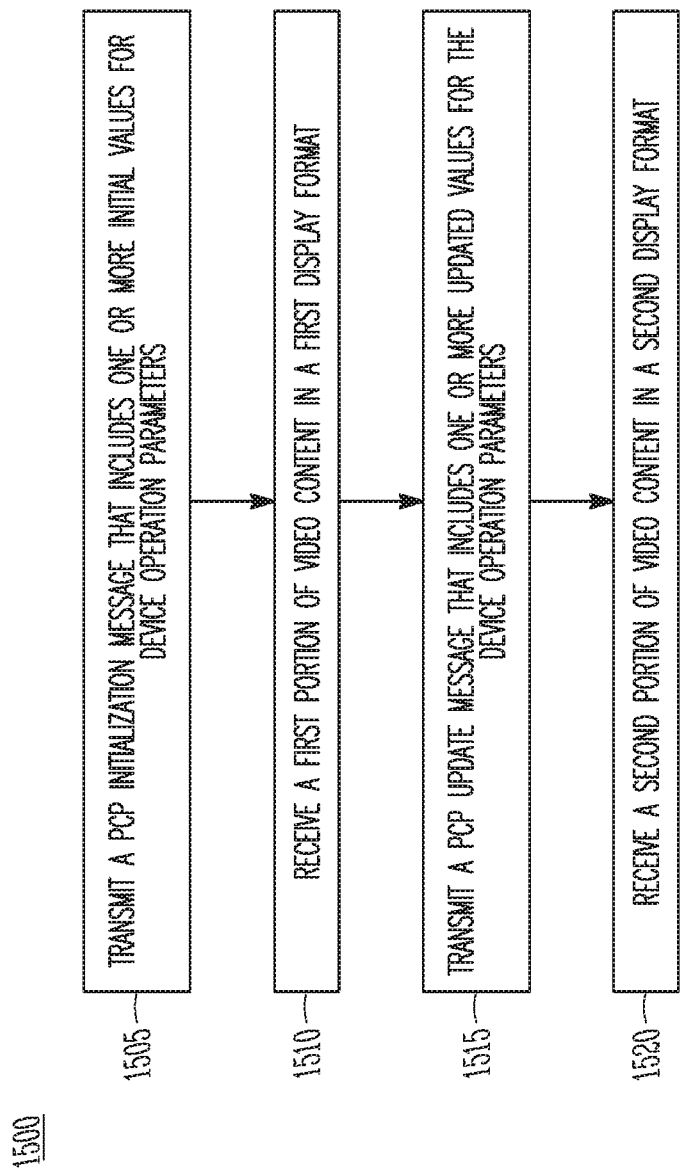
FIG. 15 illustrates the operation of a method for receiving application content in accordance with some embodiments.

FIG. 15 illustrates the operation of a method for receiving application content in accordance with some embodiments. It is important to note that embodiments of the method 1500 may include additional or even fewer operations or processes in comparison to what is illustrated in FIG. 15. In addition, embodiments of the method 1500 are not necessarily limited to the chronological order that is shown in FIG. 15. In describing the method 1500, reference may be made to FIGS. 10-14 and 16-24, although it is understood that the method 1500 may be practiced with any other suitable systems, interfaces and components. For example, reference may be made to the scenario described earlier regarding FIG. 14 for illustrative purposes, but the techniques and operations of the method 1500 are not so limited.

In addition, while the method 1500 and other methods described herein may refer to eNBs 1004 or UEs 1002 operating in accordance with 3GPP or other standards, embodiments of those methods are not limited to just those eNBs 1004 or UEs 1002 and may also be practiced by other mobile devices, such as a Wi-Fi access point (AP) or user station (STA). Moreover, the method 1500 and other methods described herein may be practiced by wireless devices configured to operate in other suitable types of wireless communication systems, including systems configured to operate according to various IEEE standards such as IEEE 802.11.

In some embodiments, content for an application may be received at the UE 1002 or other component. As an example, the application may be a video application, a video playback application or a streaming video application. As another example, the application may be a multimedia application that supports video playback of video content or streaming video at the UE 1002. As another example, the application may utilize audio or other content for playback or display at the UE 1002. These examples of applications are not limiting, however, as other suitable applications may be used and may practice techniques and operations described herein.

In some embodiments, the UE 1002 may support a PCP client and the application may operate as part of the PCP client. Accordingly, the UE 1002 may transmit messages that may be formatted for reception at a PCP server 1300. The UE 1002 may also receive content from the PCP server 1300. In some embodiments, the UE 1002 may transmit the messages and may receive the content indirectly to/from the PCP server 1300 through an eNB 1004 operating as a relay. These embodiments are not limiting, however, as the communication with the PCP server 1300 may take place through other indirect or direct paths.

At operation 1505 of the method 1500, a PCP initialization message may be transmitted by the UE 1002. In some embodiments, the PCP initialization message may include initial values for one or more device operation parameters related to usage of an application at the UE 1002. As an example, the device operation parameters may describe or indicate operational aspects of the UE 1002 and/or operational aspects associated with usage of the application at the UE 1002. As another example, the device operation parameters may describe or indicate environmental aspects that may affect operation of the UE 1002 and/or usage of the application at the UE 1002. It is understood that these examples of device operation parameters are not limiting, as other suitable parameters may be used in addition to or instead of those described above. In addition, the device operation parameters may be or may include end-user application information, user context information or similar in some cases.

Information included in the device operation parameters may assist the network (or components of it) in optimization and/or improvement of system and device operation. As an example, appropriate formatting of video content or other content destined for the UE 1002 may be determined or adjusted based at least partly on information in the device operation parameters. Such a determination or adjustment may take into account various tradeoffs of factors like end-user Quality of Experience (QoE) associated with playback of the content at the UE 1002, utilization of limited available system throughput for transmission of the content, battery life of the UE 1002, and other factors. In some cases, a correlation or a relationship may be established between network resources and content quality delivered for the application. Examples of such will be presented below. In some embodiments, one or more components within or external to the network may perform such operations.

Figure 16:
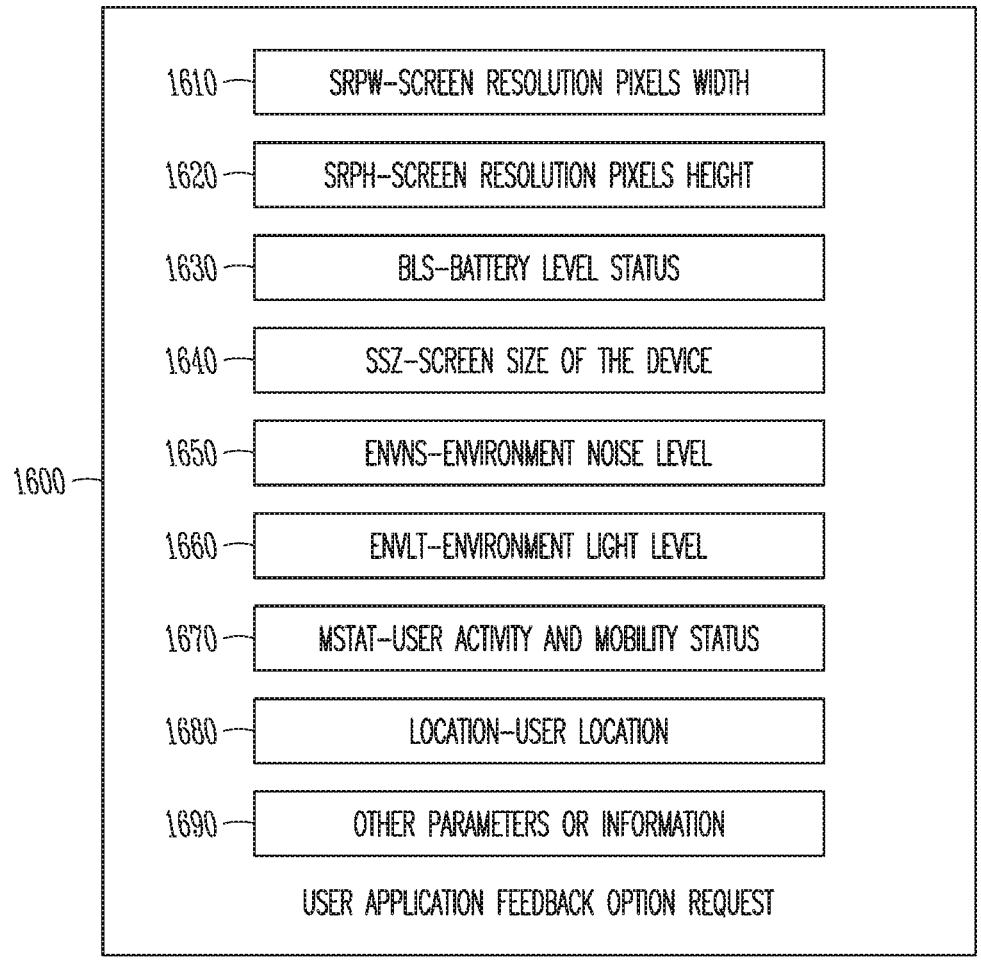
FIG. 16 illustrates an example of a User Application Feedback Option Request message in accordance with some embodiments.

FIG. 16 illustrates an example of a User Application Feedback Option Request message in accordance with some embodiments. It should be noted that "User Application Feedback Option Request message" may refer to a PCP PEER or PCP MAP message that includes a User Application Feedback option in a request format or mode, in some embodiments. The message 1600 may be or may be similar to the PCP initialization message described above or to a PCP update message that will be described later. It should be noted that some embodiments may include some, any or all of the device operation parameters shown in the example message 1600, and some embodiments may also include additional parameters not shown in the example message 1600. In addition, the order and format shown in the example message 1600 are not limiting, and are presented for illustrative purposes. In some embodiments, the PCP initialization message may include a PCP PEER request that includes a user application feedback request.

Parameter values may be given in any suitable format. As an example, some parameters may be Boolean, taking on values such as yes/no or similar. As another example, some parameters may take values of any suitable number of bits or other digits. As another example, some parameters may take descriptive values, which may be mapped to numbers in some cases.

The message 1600 may include one or more screen resolution parameters such as the "SRPW—Screen Resolution Pixels Width" 1610 and/or the "SRPH—Screen Resolution Pixels Height" 1620 shown in FIG. 16, or similar parameters. The screen resolution parameters may include a number of pixels for the width and/or height of a screen or a display at the UE 1002. As a non-limiting example, the screen resolution parameters may take the value of "0" to indicate that no information or update is included or required.

The message 1600 may include one or more battery level status parameters such as the "BLS—Battery Level Status" 1630. The battery level status parameter may describe or indicate a battery level of the UE 1002 and may be numerical or descriptive. As an example, the battery level status parameter may take values such as "fading," "weak," "medium," "high," and "very high," which may map in a predetermined manner to numbers such as 1-5. Such descriptive values may also refer to or map to a set of predetermined classifications in terms of energy, voltage or other measurement(s). As another example, the battery level status parameter may include numerical values related to energy, voltage or other measurement(s). In some cases, the battery level status parameter may take the value of "0" to indicate that no information or update is included or required.

The message 1600 may include a screen size parameter such as the "SSz—Screen Size of the Device" 1640. The screen size parameter may describe or indicate a size of a screen or a display at the UE 1002 and may be numerical or descriptive. As an example, the screen size parameter may take values such as "very small," "small," "medium," "big," and "very big," which may map in a predetermined manner to numbers such as 1-5. Such descriptive values may also refer to or map to a set of predetermined classifications in terms of area, height, width or other dimension(s). As another example, the screen size parameter may include numerical values related to area, height, width or other dimension(s). In some cases, the screen size parameter may take the value of "0" to indicate that no information or update is included or required.

The message 1600 may include an environmental noise level parameter such as the "EnvNs—Environment Noise Level" 1650. The environmental noise level parameter may describe or indicate a noise level or volume for the physical environment around the UE 1002 and may be numerical or descriptive. As an example, the environmental noise level parameter may take values such as "very small," "small,"

"medium," "noisy," and "very noisy," which may map in a predetermined manner to numbers such as 1-5. Such descriptive values may also refer to or map to a set of predetermined classifications in terms of decibel (dB) or other measurement(s). As another example, the environmental noise level parameter may include numerical values related to dB or other measurement(s). In some cases, the environmental noise level parameter may take the value of "0" to indicate that no information or update is included or required.

The message 1600 may include an environmental light level parameter such as the "EnvLt—Environment Light Level" 1660. The environmental light level parameter may describe or indicate a lighting level or brightness level for the physical environment around the UE 1002 and may be numerical or descriptive. As an example, the environmental light level parameter may take values such as "poor," "dim," "good," "bright," and "very bright," which may map in a predetermined manner to numbers such as 1-5. Such descriptive values may also refer to or map to a set of predetermined classifications in terms of lighting, brightness or other measurement(s). As another example, the environmental light level parameter may include numerical values related to lighting, brightness or other measurement(s). In some cases, the environmental light level parameter may take the value of "0" to indicate that no information or update is included or required.

The message 1600 may include an indicator of user motion such as the "Mstat—User Activity and Mobility Status" 1670. The indicator of user motion may describe or indicate a level of mobility associated with the UE 1002 and may be numerical or descriptive. As an example, the indicator of user motion may take values such as "static," "weak mobility," "regular mobility," and "high mobility," which may map in a predetermined manner to numbers such as 1-4. Such descriptive values may also refer to or map to a set of predetermined classifications in terms of speed, transportation mode or other measurement(s). For instance, the previously described "weak mobility," "regular mobility," and "high mobility" may correspond to modes such as "walking," "running," and "via train." As another example, the indicator of user motion may include numerical values related to speed or other measurement(s). In some cases, the indicator of user motion may take the value of "0" to indicate that no information or update is included or required.

The message 1600 may include a UE 1002 location such as the "Location—User Location" 1680. The UE 1002 location may describe or indicate a physical or geographic location of the UE 1002 or a user and may be numerical or descriptive. As an example, the UE 1002 location may include GPS or other geographic coordinates. In some cases, the UE 1002 location may take the value of "0" to indicate that no information or update is included or required.

The message 1600 may include other parameters or information 1690, which may or may not be related to the previously described device operation parameters or to device operation. For instance, control information for the message 1600 may be included.

Figure 17:
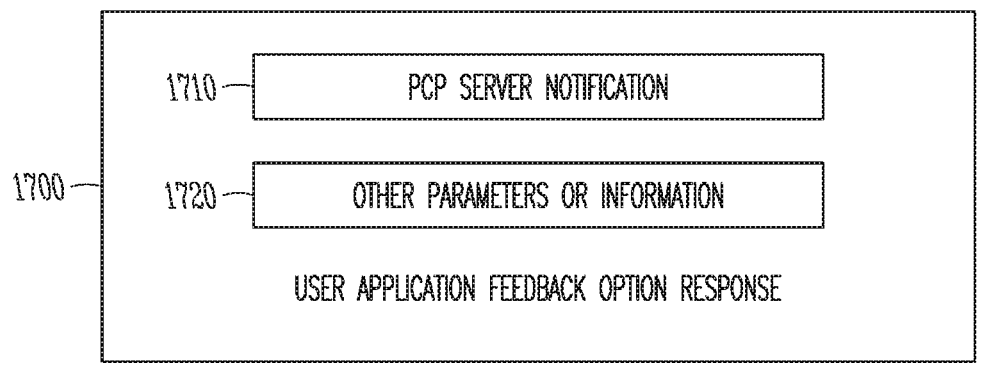
FIG. 17 illustrates an example of a User Application Feedback Option Response message in accordance with some embodiments.

FIG. 17 illustrates an example of a User Application Feedback Option Response message in accordance with some embodiments. It should be noted that "User Application Feedback Option Response message" may refer to a PCP PEER or PCP MAP message that includes a User Application Feedback option in a response format or mode, in some embodiments. In some embodiments, the User Application Feedback Option Response message 1700 may be sent in response to the User Application Feedback Option Request message 1600 described above, and may indicate application support for one or more device operation parameters. Accordingly, the message 1700 may indicate whether or not the PCP server 1300 supports exchanging of content that is compatible with device operation parameters received in the PCP initialization message or PCP update message. The message 1700 may be or may be similar to a PCP response message. It should be noted that some embodiments may include some, any or all of the parameters shown in the example message 1700, and some embodiments may also include additional parameters not shown in the example message 1700. In addition, the order and format shown in the example message 1700 are not limiting, and are presented for illustrative purposes. In some embodiments, the PCP support message may include a PCP PEER request that includes a user application feedback response.

The PCP server notification 1710 may indicate support as described above. As an example, the PCP server notification 1710 may take on values such as yes/no to indicate whether the request can or cannot be satisfied. As another example, the PCP server notification 1710 may take on a range of values such as "request cannot be satisfied," "request can be partially satisfied," "request can be satisfied," and "request can be fully satisfied." These examples are not limiting, however, and other suitable techniques for indicating support may be used. In addition, the message 1700 may include other parameters or information 1720, which may or may not be related to support of the request. For instance, control information for the message 1700 may be included.

Figure 18:
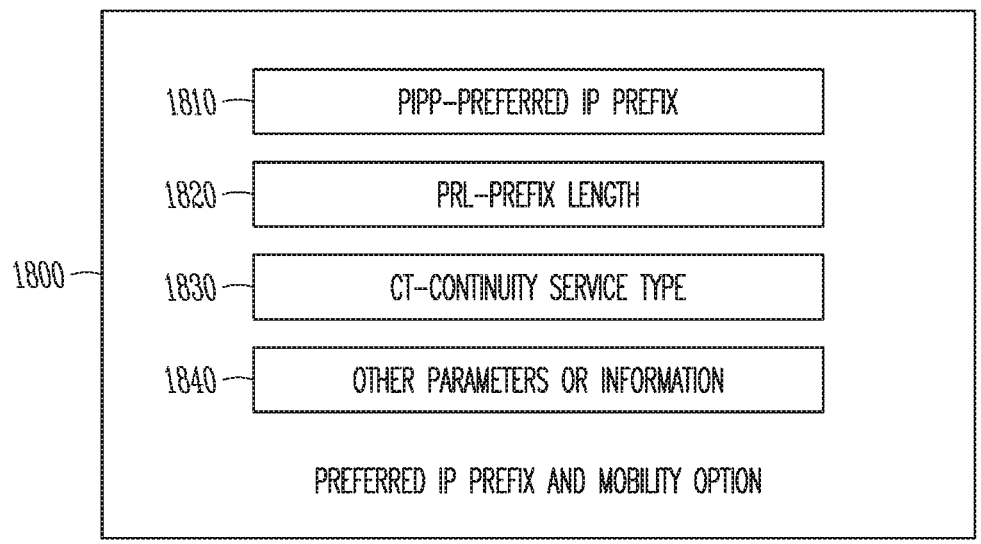
FIG. 18 illustrates an example of a Preferred Internet Protocol (IP) Prefix and Mobility Option message in accordance with some embodiments.

FIG. 18 illustrates an example of a Preferred Internet Protocol (IP) Prefix and Mobility (PIPPM) Option message in accordance with some embodiments. It should be noted that "PIPPM Option message" may refer to a PCP PEER or PCP MAP message that includes a PIPPM option, in some embodiments. The PIPPM Option message 1800 may be sent from a PCP client for reception at a PCP server or other network component. The message 1800 may be or may be similar to a PCP initialization message or a PCP update message as described earlier. The message 1800 may be sent in addition to or instead of previously described messages such as the "User Application Feedback Option Response" message 1600. It should be noted that some embodiments may include some, any or all of the parameters shown in the example message 1800, and some embodiments may also include additional parameters not shown in the example message 1800. In addition, the order and format shown in the example message 1800 are not limiting, and are presented for illustrative purposes.

The message 1800 may include a Preferred IP Prefix (PIPP) 1810, which may be or may include an prefix used by the UE 1002. In some cases, the PIPP 1810 may be an IP prefix used frequently by the UE 1002 or an IP prefix that has been used recently by the UE 1002. These examples are not limiting, however, as the PIPP may be determined in any suitable manner, including determination by another component or determination that may not necessarily be based on past usage of the PIPP. In some embodiments, the PIPP 1810 may be 16 octets in length, but this is not limiting, as the PIPP 1810 may occupy any suitable number of octets, bits or bytes. The length may be specified, in some cases, as part of a standard such as 3GPP or Internet Engineering Task Force (IETF) or other.

The message 1800 may also include Prefix Length (PrL) 1820, which may indicate the length, size or number of bits in the PIPP 1810. In some embodiments, a value of "0" may indicate that no preferred IP prefix is communicated in the message 1800. The message 1800 may also include an IP continuity parameter 1830 which may be a "CT—Continuity Service Type" parameter or similar. The IP continuity parameter 1830 may indicate whether the UE 1002 requires or expects the network to maintain IP continuity service after handoff. In some embodiments, IP continuity service may include providing a routing mechanism to route packets to the UE 1002 after one or more events. As an example event, the UE 1002 may change an attachment point to the network. As another example event, the UE 1002 may use an IP prefix that has changed or is different from a previous or original IP prefix allocated to the UE 1002. In addition, the message 1800 may include other parameters or information 1840, which may or may not be related to the IP prefix or IP continuity. For instance, control information for the message 1800 may be included.

Returning to the method 1500, a first portion of video content formatted according to a first display format may be received at operation 1510. In some embodiments, the first portion may be for use by the application during a first time period. Although not limited as such, the display format may include or be described by one or more content format parameter values such as an encoded bit rate, a brightness level or other values that may describe how the portion of video content (or other content in some cases) is formatted for use by the application. As another example, the display format may include or be described by a video quality level for the portion of video content, which may be described by categories such as "high definition" or "standard definition" or similar.

In some embodiments, the first display format may be based at least partly on the initial values for one or more of the device operation parameters previously described. As an example, larger values for the encoded bit rate of the first portion of video content may be selected by the network when it is informed that the UE 1002 has a relatively large screen. As another example, a higher brightness level for the first portion of video content may be selected by the network when an environmental light level at the UE 1002 is reported to be high, which may improve user viewing. While these examples may illustrate concepts, they are not limiting. In addition, the first display format may also be based at least partly on other settings, parameters or defaults in some embodiments.

Returning to the method 1500, a PCP update message that includes one or more updated values for the device operation parameters may be transmitted at operation 1515. As described earlier regarding the PCP initialization message, the PCP update message may be or may be similar to the User Application Feedback Option Request message 1600 shown in FIG. 16. As an example, the PCP update message may include device operation parameter values for some or all of the parameters shown in the message 1600. As another example, the PCP update message may include updated device operation parameter values for some or all of the device operation parameter values included in the PCP initialization message. Although the PCP update message may be of a similar format to the PCP initialization message and may include some or all of the device operation parameters included in the PCP initialization message, it is not limited as such. In some embodiments, the PCP update message may include a PCP PEER request that includes a user application feedback request.

In some embodiments, the PCP update message may be transmitted by the UE 1002 at least partly in response to a change, at the UE 1002, of one or more of the device operation parameters included in the PCP update message. As an example, when a user moves outside to a brighter environment, this change may be detected and communicated in the PCP update message. These embodiments are not limiting, however, as the transmission of the PCP update message may also be based on a schedule or a transmission interval in some cases. That is, the UE 1002 may transmit the PCP update message to inform the network of its most current values for one or more of the device operation parameters. It should also be noted that some embodiments of the method 1500 may not include transmission of the PCP initialization message (operation 1505), in which case the PCP update message may include device operation parameter values that are not necessarily "updated" values.

At operation 1520, a second portion of the video content formatted according to a second display format may be received at operation 1510. In some embodiments, the second portion may be for use by the application during a second time period. Accordingly, the first portion and the second portion of the video content may enable a streaming video playback by the application during a time period that includes the first and second time periods. The first and second time periods may be non-overlapping in some embodiments, and may or may not be continuous in time. In addition, the time period may also include additional portions of the video content (like a third, fourth, etc.). In some cases, although not limiting, a continuous video clip may comprise various portions of video content as described above, and the playback of the portions by the application may appear to a user as playback of the continuous video clip.

Although not limited as such, the second display format may be based at least partly on the updated values of the device operation parameters included in the PCP update message. As previously described for the first display format, values for the encoded bit rate, brightness level and other parameters for the second display format may be selected by the network based on the received device operation parameters in the PCP update message. The second display format may also be based at least partly on other settings, parameters or defaults in some embodiments in addition, changes or differences between the first display format and the second display format may be at least partly based on device operation parameter values in the PCP update message and/or the PCP initialization message.

Several non-limiting examples of content formatting based at least partly on device operation parameter values will be presented below. It is understood that these examples are not limiting, however, as the display format may also be based at least partly on other settings, parameters or defaults in some embodiments. Throughout these examples, terms like "high," "low," "sufficiently high," "sufficiently low" or similar may be based on thresholds or other appropriate classifications, which may be predetermined in some cases.

As an example of content formatting based at least partly on device operation parameter values, video content at a high encoded bit rate or resolution may be transmitted to the UE 1002 when a buffering level of the application is sufficiently high, a battery level of the UE 1002 is sufficiently high, and an available network throughput condition is sufficiently high.

As another example, an encoded bit rate or resolution for a second portion of video content may be reduced in comparison to that for a first portion of the video content when a battery level of the UE 1002 degrades during a video session, even when a buffering level of the application remains sufficiently high. Accordingly, this may preserve battery life and may prevent interruption of the video session due to battery failure.

As another example, an encoded bit rate or resolution for video content may be reduced for a second portion in comparison to a first portion when a buffering level of the application and/or an available network throughput are reduced, even when a battery level of the UE 1002 remains sufficiently high. Accordingly, this may preserve battery life.

As another example, an encoded bit rate or resolution for video content may be low when a display size of the UE 1002 is sufficiently low. Transmission errors may be less observable on a smaller display, especially when a user of the UE 1002 is mobile and when an environmental noise level is high. As such, battery resources may be saved and network throughput may be saved, even when a buffering level of the application and an available network throughput are sufficiently high. This scenario may be useful for content categories such as news and non-live content, in which transmission errors may have less impact on user perception.

As another example, a brightness level for video content may be increased and an encoded bit rate may be reduced when a user or the UE 1002 is in an environment with a high lighting level and when a battery level of the UE 1002 is sufficiently low. Accordingly, the lower bit rate may compensate for additional power consumed by displaying at a higher brightness.

As another example, a brightness level for video content may be reduced when a user or the UE 1002 is in an environment with a low lighting level. This may be performed regardless of battery level and available throughput in some cases. Accordingly, a perceived video quality may be improved while battery' resources may be preserved.

As another example, a user or the UE 1002 may receive content, including targeted advertisements for regional services, according to user location, mobility status and a battery level of the UE 1002. Accordingly, battery resources and network throughput may be preserved.

As another example, the first portion of the video content may be formatted according to a first brightness level and the second portion of the video content may be formatted according to a second, different brightness level. The change in the brightness level may be performed based on one or more received updated device operation parameter values in the PCP update message.

As another example, the first portion of the video content may be formatted according to a first encoded data rate value and the second portion of the video content may be formatted according to a second, different encoded data rate value. The change in the encoded data rate value may be performed based on one or more received updated device operation parameter values in the PCP update message.

As another example, the first portion of the video content may be formatted according to a first video quality level and the second portion of the video content may be formatted according to a second, different video quality level. The change in the video quality level may be performed based on one or more received updated device operation parameter values in the PCP update message.

Figure 19:
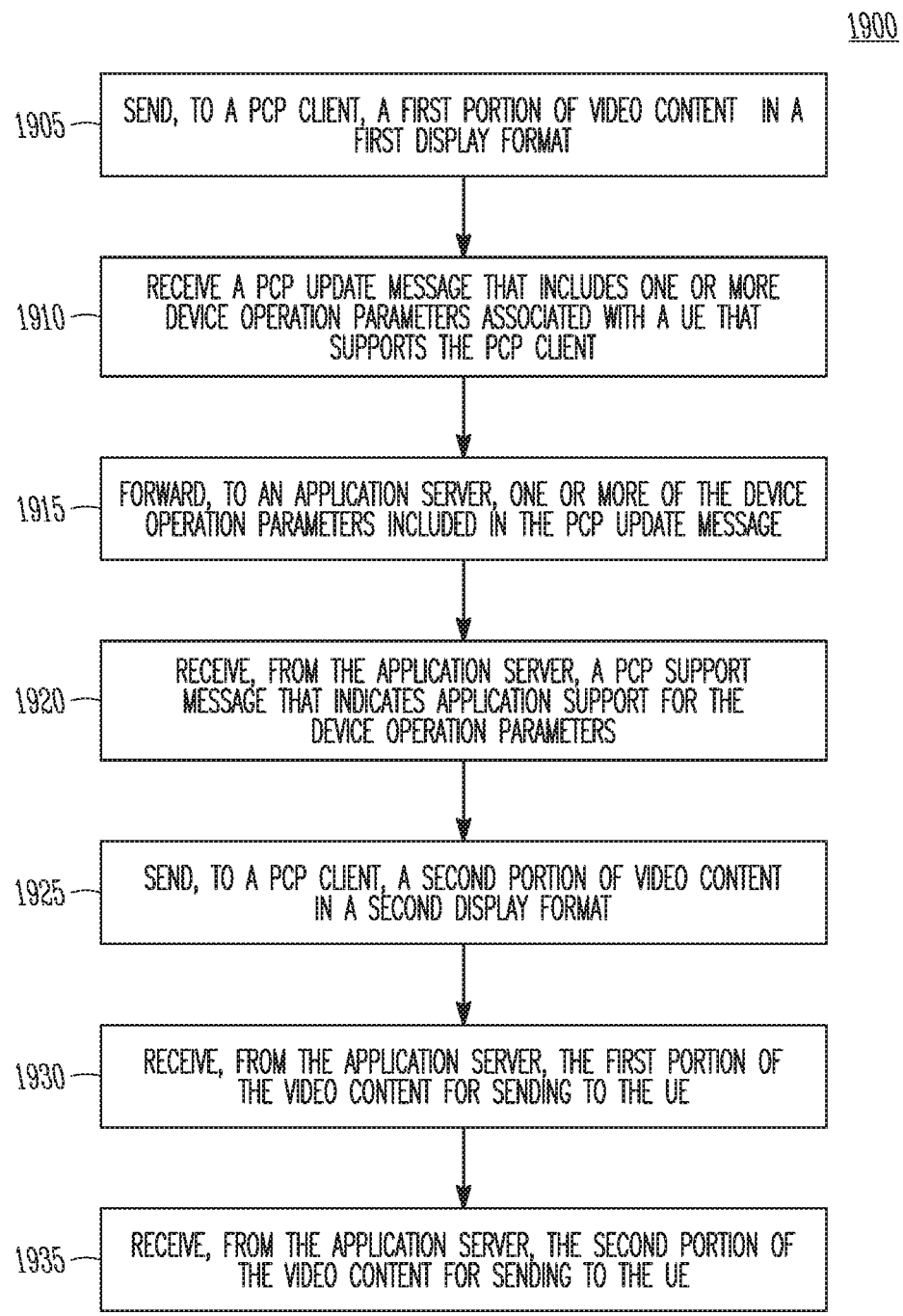
FIG. 19 illustrates the operation of a method for sending application content in accordance with some embodiments.

FIG. 19 illustrates the operation of a method for sending application content in accordance with some embodiments. As mentioned previously regarding the method 1500, embodiments of the method 1900 may include additional or even fewer operations or processes in comparison to what is illustrated in FIG. 19 and embodiments of the method 1900 are not necessarily limited to the chronological order that is shown in FIG. 19. In describing the method 1900, reference may be made to FIGS. 10-18 and 20-24, although it is understood that the method 1900 may be practiced with any other suitable systems, interfaces and components. For example, reference may be made to the scenario described earlier in FIG. 14 for illustrative purposes, but the techniques and operations of the method 1900 are not so limited. In addition, embodiments of the method 1900 may refer to eNBs 1004, UEs 1002, APs, STAs or other wireless or mobile devices.

It should be noted that the method 1900 may be practiced at a PCP server 1300, and may include exchanging of signals or messages with the UE 1002. Similarly, the method 1500 may be practiced at the UE 1002, and may include exchanging of signals or messages with the PCP server 1300. In some cases, operations and techniques described as part of the method 1500 may be relevant to the method 1900. For instance, an operation of the method 1500 may include transmission of a message by the UE 1002 while an operation of the method 1900 may include reception of the same message or similar message at the PCP server 1300.

At operation 1905 of the method 1900, a first portion of video content in a first format may be sent to a PCP client for use by an application. At operation 1910, a PCP update message may be received. The PCP update message may include one or more device operation parameters associated with the UE 1002, which may support the PCP client. In some embodiments, the first portion of the video content may be sent from the PCP server to an eNB 1004 operating in a 3GPP network for forwarding to the UE 1002. Similarly, the PCP update message received at the PCP server 1300 may be forwarded from the eNB 1004 operating as a relay for the UE 1002. These embodiments are not limiting, however, as the PCP server 1300 may communicate with the PCP client directly or through a path that may include other base stations and/or mobile devices in some cases.

It should be noted that previous discussion regarding the device operation parameters, PCP initialization message, PCP update message and other concepts of the method 1500 may also be applicable to the method 1900 in some cases, although the method 1900 is not limited as such. For instance, various device operation parameters, display formats, and message formats discussed previously regarding the method 1500 may also be used in the method 1900, in some cases. Accordingly, the display format may include or may be described by any of various parameters such as an encoded bit rate, a brightness level or others. The format for the content may be determined or selected based at least partly on one or more device operation parameters, including but not limited to those previously described. For instance, device operation parameters like those included in the message 1600 shown in FIG. 16 may be used. In some embodiments, device operation parameter values (initial, updated or otherwise) may be included in a PCP initialization message, PCP update message, or any other suitable message. The format for the content may also be determined or selected based at least partly on other factors, including defaults or default values for one or more of the device operation parameters.

At operation 1915 of the method 1900, one or more of the device operation parameters included in the PCP update message may be forwarded to an application server. In some embodiments, the PCP update message may be forwarded or included as part of another message. In some embodiments, the device operation parameters may be extracted from the received PCP update message and forwarded to the application server in another message. The application server may be internal or external to the network, and may provide some or all of the video content that is sent to the PCP client for use in the application.

A PCP support message that indicates application support for the device operation parameters may be received from the application server at operation 1920. The PCP support message may indicate whether or not content may be provided by the PCP server that is compatible with one or more device operation parameters, which may be communicated from the PCP client. In some embodiments, the PCP support message may be a response to the received PCP update message and/or device operation parameters included in it. In some embodiments, the PCP support message may be a response to a received PCP initialization message and/or device operation parameters included in it.

Returning to the method 1900, a second portion of video content in a second display format may be sent to the PCP client at operation 1925. As previously described, the second display format may be at least partly based on one or more device operation parameter values included in the PCP update message or in the PCP initialization message. The second display format may be different from the first display format, and the change or difference between the display formats may be based on updated device operation parameter values. Accordingly, the example scenarios previously described regarding formatting based on device operation parameter values may be applicable to the method 1900.

At operation 1930, the first portion of the video content may be received from the application server for sending to the UE 1002. The second portion of the video content may be received from the application server for sending to the UE 1002 at operation 1935. Accordingly, the application server may provide the video content to the PCP server in one or more formats that are based on device operation parameter values. These embodiments are not limiting, however, as the application server may provide multiple versions of the same content in different formats to the PCP server in some embodiments. As such, the PCP server or other component may select or determine which version of content to send to the PCP client based at least partly on device operation parameter values.

Figure 20:
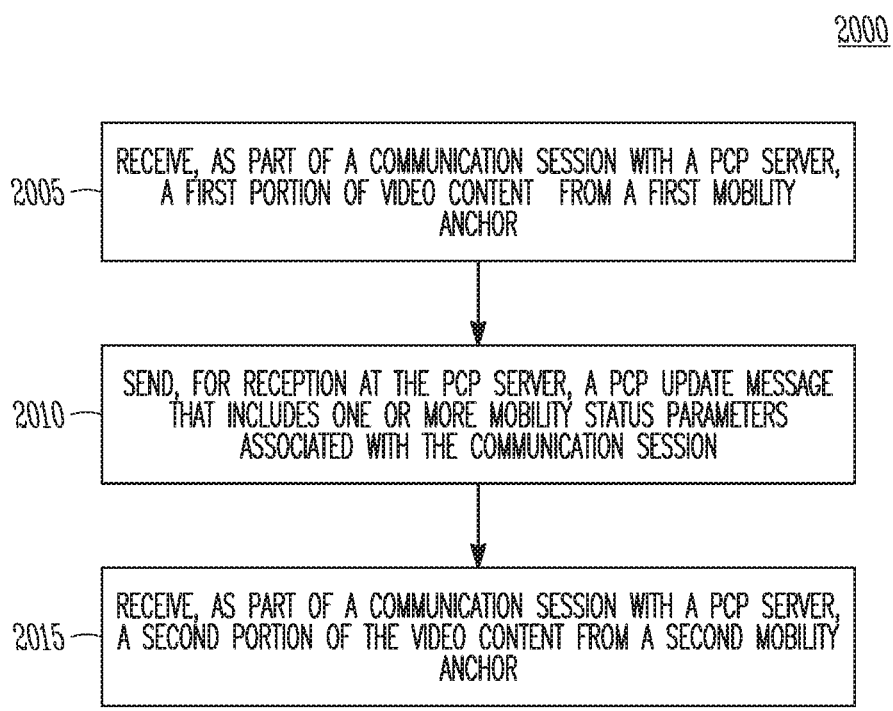
FIG. 20 illustrates the operation of another method for receiving application content in accordance with some embodiments.

FIG. 20 illustrates the operation of another method for receiving application content in accordance with some embodiments. As mentioned previously regarding the method 1500, embodiments of the method 2000 may include additional or even fewer operations or processes in comparison to what is illustrated in FIG. 20 and embodiments of the method 2000 are not necessarily limited to the chronological order that is shown in FIG. 20. In describing the method 2000, reference may be made to FIGS. 10-19 and 21-24, although it is understood that the method 2000 may be practiced with any other suitable systems, interfaces and components. For example, reference may be made to the scenario described earlier in FIG. 14 for illustrative purposes, but the techniques and operations of the method 2000 are not so limited. In addition, embodiments of the method 2000 may refer to eNBs 1004, UEs 1002, APs, STAs or other wireless or mobile devices.

At operation 2005 of the method 2000, a first portion of video content may be received as part of a communication session with a PCP server. In some embodiments, the first portion may be received from the PCP server via a first mobility anchor, which may operate as a relay for the PCP server. The first mobility anchor may be supported by a first eNB 1004 operating in a 3GPP network, but is not limited as such. A video application or multimedia application may be supported by a PCP client at the UE 1002, and the first portion of video content may be for use by the application during a first time period. The video content or other forms of content previously described may be used as part of the method 2000, along with previously described video or other applications.

At operation 2010 of the method 2000, a PCP update message that includes one or more mobility status parameters associated with the communication session may be sent for reception at the PCP server. In some embodiments, the PCP update message may include (or may be) a PCP PEER message with a Preferred Internet Protocol Prefix and Mobility (PIPPM) option, as previously described in FIG. 18 regarding the message 1800. Accordingly, the mobility status parameters may include a Preferred IP prefix (PIPP) 1810, prefix length 1820, continuity service type 1830 or other parameters or information 1840, as previously described. In some embodiments, the mobility status parameters may include an IP prefix determined at the UE 1002, which may be a "preferred" IP prefix in some cases, although not limited as such.

The determination of the IP prefix included in the PCP update message may be based at least partly on historical usage and/or usage frequency of IP prefixes by the UE as part of other communication sessions. For instance, the UE 1002 may keep track of or maintain a history of information such as locations of the UE 1002 and/or source IP prefixes allocated to the UE 1002 during various time periods, such as previous communication sessions. Accordingly, one or more preferred IP prefixes or commonly used IP prefixes may be determined, and may be communicated to the network by the UE 1002 to assist in determination by the network of a mobility anchor to use for a communication session with the UE 1002. As an example, a preferred IP prefix may be associated with network connectivity or content delivery at a component or mobility anchor at a location frequently visited or occupied by the user, such as a home or restaurant or other location.

In some embodiments, the mobility status parameters may further include an IP continuity parameter (such as the continuity service type 1830) that may indicate support for reception from the second mobility anchor according to a second IP prefix different from a first IP prefix used for reception from the first mobility anchor. The UE 1002 may receive the second IP prefix from the first mobility anchor in some cases.

At operation 2015, a second portion of the video content may be received from a second mobility anchor for use by the application during a second time period. In some embodiments, the second mobility anchor may be based at least partly on the mobility status parameters included in the PCP update message. For instance, a second IP prefix used for the reception from the second mobility anchor may be based on or may be the same as a preferred IP prefix included in the PCP update message. In some embodiments, the first IP prefix may be reserved for the first mobility anchor and the preferred IP prefix may be reserved for the second mobility anchor. Accordingly, the network may switch the communication session to the second mobility anchor based at least partly on the preferred IP prefix received in the PCP update message.

In some embodiments, the first portion of the video content may be formatted according to a first encoded bit rate and the second portion of the video content may be formatted according to a second encoded bit rate. The second rate may be reduced in comparison to the first rate, in some cases, and the reduction may be based at least partly on the determined IP prefix included in the PCP update message. For instance, based on the fact that a new IP prefix is included in the PCP update message, the network may decide that after a switch to the second mobility anchor, the second portion of the video content should be sent at a reduced rate to make the transition easier for the application in terms of buffering the content. In some embodiments, the first portion and second portion of the video content may enable video playback of the video content by the application, as described earlier regarding the method 1500.

In some embodiments, the first mobility anchor may be supported by a first eNB 1004 and the second mobility anchor may be supported by a second, different eNB 1004. These embodiments are not limiting, however, as the two mobility anchors may be supported by the same eNB 1004 in some cases.

Figure 21:
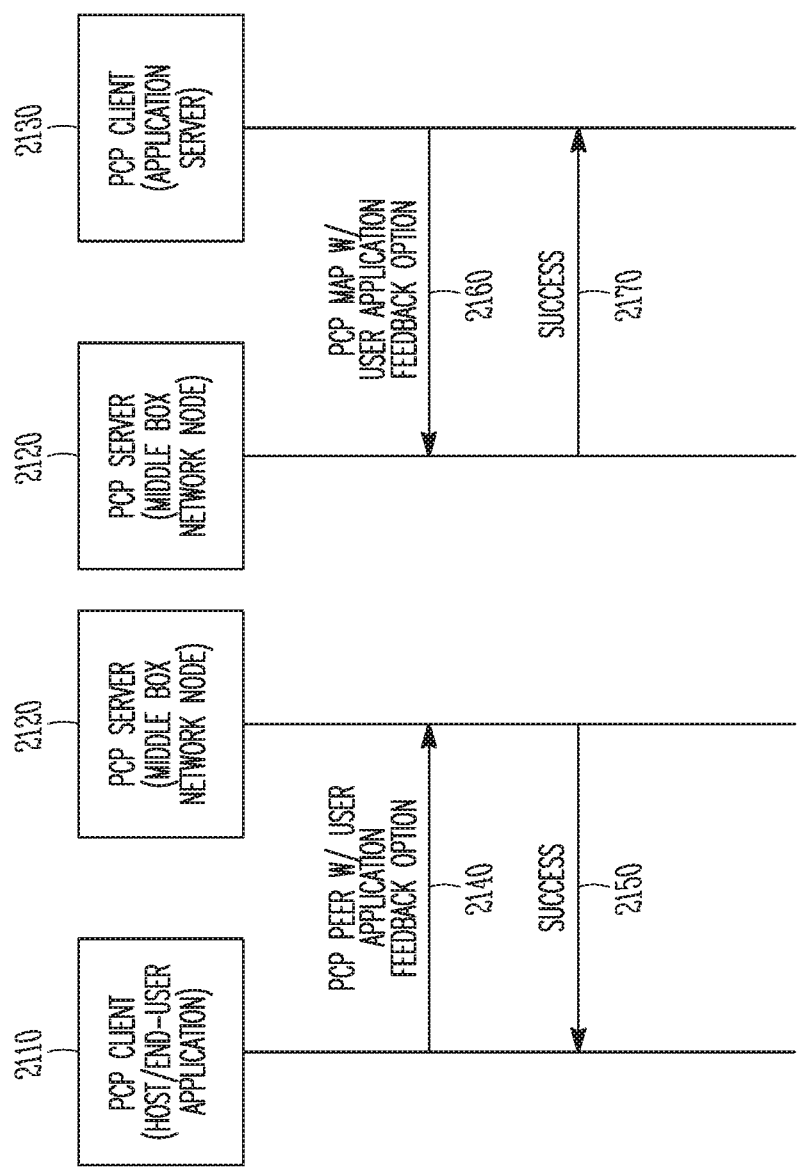
FIG. 21 illustrates an example of communication between a PCP client and a PCP server in accordance with some embodiments.

FIG. 21 illustrates an example of communication between a PCP client and a PCP server in accordance with some embodiments. The example may represent direct communication between one or more PCP clients and the PCP server. As shown in FIG. 21, the PCP client 2110 may be implemented by or supported by a host or end-user application while the PCP client 2130 may be implemented by or supported by an application server. The PCP server 2120 may be a middle box network node, although not limited as such. In some cases, the PCP server 2120 may manage content storage and relaying for the PCP clients 2110, 2130.

The PCP client 2110 may send to the PCP server 2120 the message 2140, which may be a PCP PEER with "User Application Feedback Option Request" or similar, as described earlier in FIG. 16. The PCP server 2120 may respond with a message 2150, which may be a "User Application Feedback Option Response" or similar, as described earlier in FIG. 17. The message 2150 may indicate whether or not content with characteristics (display format, for instance) that match parameters included in the message 2140 can be supported by the PCP server 2120.

The PCP client 2130 may send to the PCP server 2120 the message 2160, which may be a PCP MAP with "User Application Feedback Option Request" or similar, as described earlier in FIG. 16. The PCP server 2120 may respond with a message 2170, which may be a "User Application Feedback Option Response" or similar, as described earlier in FIG. 17. The message 2170 may indicate whether or not content with characteristics (display format, for instance) that match parameters included in the message 2160 can be supported by the PCP server 2120.

Figure 22:
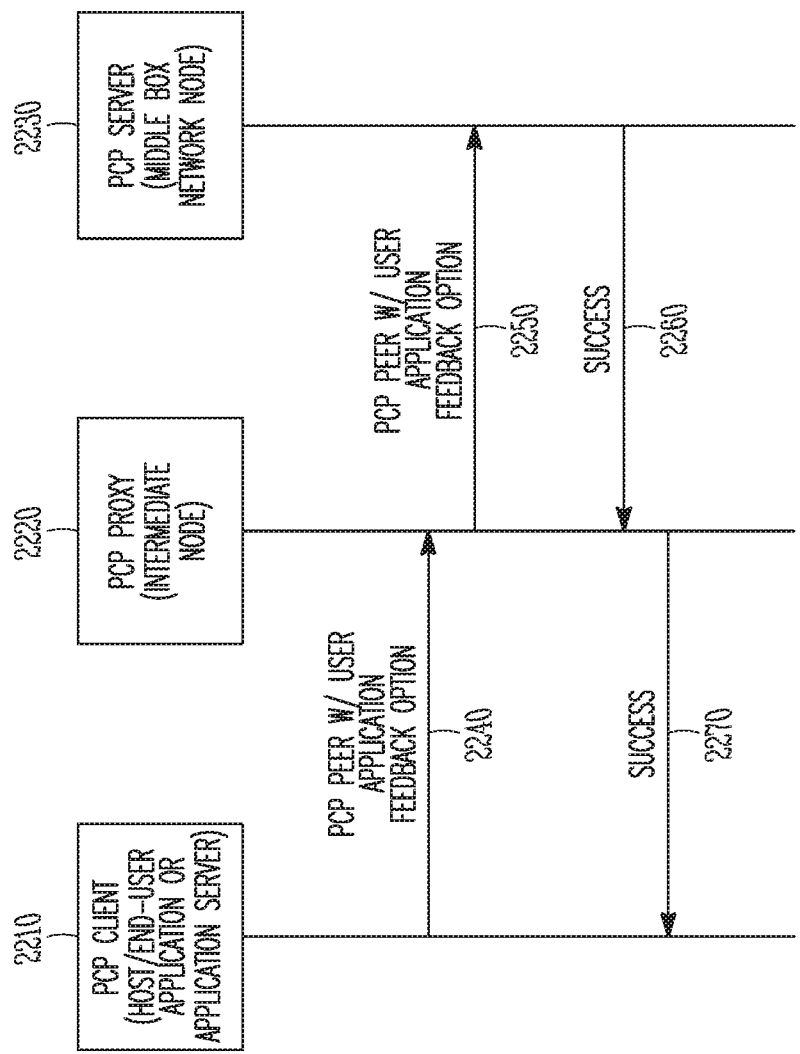
FIG. 22 illustrates another example of communication between a PCP client and a PCP server in accordance with some embodiments.

FIG. 22 illustrates another example of communication between a PCP client and a PCP server in accordance with some embodiments. The example may represent communication between the PCP client 2210 and the PCP server 2230 via a PCP proxy 2220. As shown in FIG. 22, the PCP client 2210 may be implemented by or supported by a host or end-user application or an application server. The PCP proxy 2220 may be an intermediate node, although not limited as such. In some cases, the PCP proxy 2220 may relay or forward messages between the PCP client 2210 and the PCP server 2230.

The PCP client 2210 may send to the PCP proxy 2220 the message 2240, which may be a PCP PEER with "User Application Feedback Option Request" or similar, as described earlier FIG. 16. The PCP proxy 2220 may forward the message 2240 (or information included in it) to the PCP server 2230 as message 2250. The PCP server 2230 may respond with a message 2260, which may be a "User Application Feedback Option Response" or similar, as described earlier in FIG. 17. The message 2260 may indicate whether or not content with characteristics (display format, for instance) that match parameters included in the messages 2240 and/or 2250 can be supported by the PCP server 2230. The PCP proxy 2220 may forward the message 2260 (or information included in it) to the PCP client 2210 as the message 2270.

Figure 23:
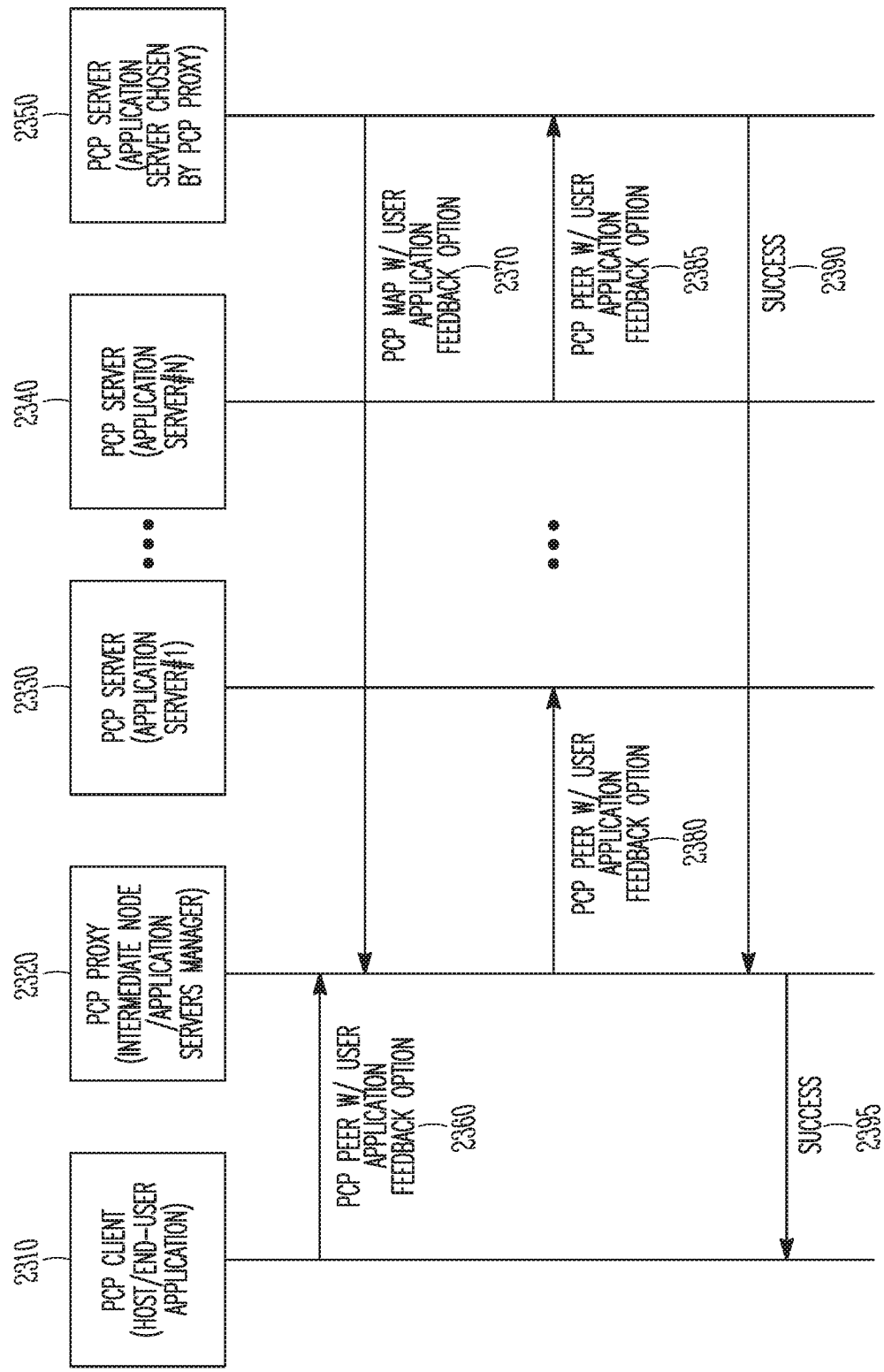
FIG. 23 illustrates another example of communication between a PCP client and a PCP server in accordance with some embodiments.

FIG. 23 illustrates another example of communication between a PCP client and a PCP server in accordance with some embodiments. The example may represent communication between one or more PCP clients and multiple PCP servers. As shown in FIG. 23, the PCP client 2310 may be implemented by or supported by a host or end-user application. The PCP proxy 2320 may be an intermediate node and/or middle box network node and may provide management of application servers, which may be or may act as PCP servers. Accordingly, the PCP proxy 2320 may be an intelligent controller that provides requests to the appropriate application server. Any number of PCP servers 2330, 2340, 2350 may be used and embodiments are not limited to the number or order shown in FIG. 23. As shown in FIG. 23, the PCP server 2350 may be an application server that is chosen by the PCP proxy 2320 as the appropriate application server with content that best matches user feedback information from the PCP client 2310.

The PCP client 2310 may send to the PCP proxy 2320 the message 2360, which may be a PCP PEER with "User Application Feedback Option Request" or similar, as described earlier in FIG. 16. The message 2360 may include feedback information from the UE 1002 such as device operation parameters described earlier. The PCP server 2350, which may be an application server chosen by the PCP proxy for providing content, may send a message 2370 to the PCP proxy 2320, which may be a PCP MAP with "User Application Feedback Option Response" or similar, as described earlier in FIG. 16. The message 2370 may include information on application content requirements in terms of devices and network resources. The PCP proxy may forward the message 2350 from the PCP client 2310 to one or more of the PCP servers 2330, 2340, 2350 as the message 2380, which may be a PCP PEER with "User Application Feedback Option" or similar. Any of the PCP servers 2330, 2340, 2350 may relay the message (or information included in it) to other PCP servers 2330, 2340, 2350 as a message such as 2385. The PCP server 2350 may send to the PCP proxy 2320 the message 2390, which may be a "User Application Feedback Option Response" or similar, as described earlier in FIG. 17. The message 2390 may indicate whether or not content with characteristics (display format, for instance) that match parameters included in messages like 2360, 2380 or 2385 can be supported by the PCP server 2350. The message 2390 may be forwarded from the PCP proxy 2320 to the PCP client 2310 as the message 2395.

Figure 24:
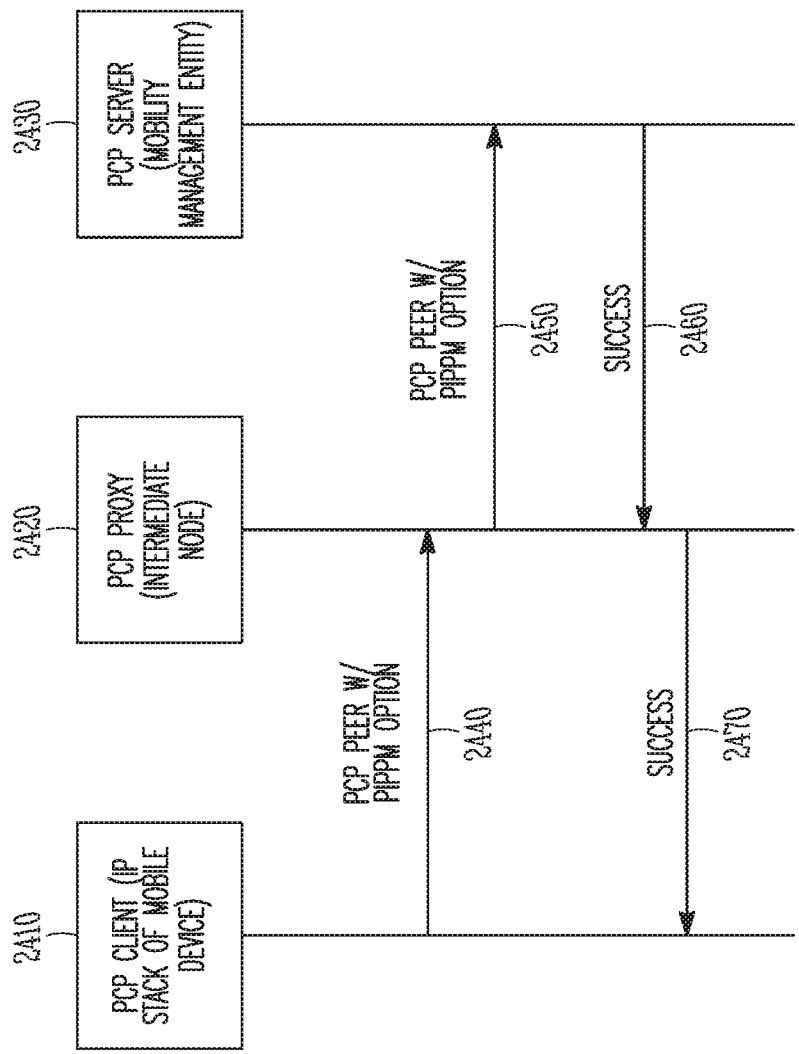
FIG. 24 illustrates another example of communication between a PCP client and a PCP server in accordance with some embodiments.

FIG. 24 illustrates another example of communication between a PCP client and a PCP server in accordance with some embodiments. The example may represent communication between the PCP client 2410 and the PCP server 2430 via a PCP proxy 2420. As shown in FIG. 24, the PCP client 2410 may be implemented by or supported by an IP stack of the UE 1002. The PCP server 2430 may be a Mobility Management Entity (MME) such as 122, in some embodiments. The PCP proxy 2420 may be an intermediate node, although not limited as such. In some cases, the PCP proxy 2420 may relay or forward messages between the PCP client 2410 and the PCP server 2430.

The PCP client 2410 may send to the PCP proxy 2420 the message 2440, which may be a PCP PEER with PIPPM Option message or similar, as described earlier in FIG. 18. The PCP proxy 2420 may forward the message 2440 (or information included in it) to the PCP server 2430 as message 2450. The PCP server 2430 may respond with a message 2460, which may be a "User Application Feedback Option Response" or similar, as described earlier in FIG. 17. The message 2460 may indicate whether or not content with characteristics (display format, for instance) that match parameters included in the messages 2440 and/or 2450 can be supported by PCP server 2430. The PCP proxy 2420 may forward the message 2460 (or information included in it) to the PCP client 2410 as the message 2470.

The examples of communication between PCP servers and PCP clients just described, along with other techniques for such communication, may enable various use cases as described below. As an example, an end user device may host a PCP client receiving content from a PCP server, which may be a middle box network node such as an edge router, home gateway or any cache node. The middle box network node may store a copy of content or may be a content relay between the application server and the end user. When the middle box network node is a relay, it may receive feedback information sent to the network by the end user application and by the application server. The node may then use the feedback information for optimizing content sent to the end user. When the middle box network node stores the content, it may use such feedback information for optimizing the stored content for sending to the end user. This example use case may be beneficial for adaptive video streaming and server-based videoconferencing. In some cases, the middle box network node may be a Multi-Point Control Unit (MCU) that may communicate with conferencing clients.

As another example, application content may be transferred or shared between multiple devices. The devices may be located behind the same residential gateway, and may therefore be reachable from the outside with the same IPv4 (IP version 4) address or IPv6 (IP version 6) prefix. Each end user device may be a host implementing a PCP client and may send feedback information (such as device operation parameters described earlier) to a middle box network node that may play the role of PCP server. A video session started on a first device (like a smart-phone) may be transferred to a second device (like a tablet or TV screen) when the second device becomes available in proximity of the first device. The middle box network may adapt the content to match device resources and network conditions of the second device. In addition, when video content is viewed by multiple users with difference device resources and/or network conditions, feedback information sent to the middle box network node from each device may enable adaptation of the application content to match the device resources and network conditions for each device.

As another example, an end-user device may support a PCP client and may receive content from an application server supporting a PCP client. A middle box network node may act as a PCP server and may store and/or relay the content. Feedback information received from the end-user device may be used to determine targeted advertisements for the end-user.

As another example, the UE 1002 may require mobility support on that traffic can flow to and from it even after a change in an attachment point with the network, which may result in a change in an IP Prefix of a source IP address for the UE 1002. Some common techniques that may be used include Mobile IP and Proxy Mobile IP. In addition, some techniques may include deployment, by the network, of multiple mobility anchors such that one or more of them may serve a mobile device such as the UE 1002. Accordingly, the UE 1002 may communicate a preferred IP prefix to the network to enable determination, by the network, of a mobility anchor to serve the UE 1002. The PCP client may provide such feedback to the PCP server that manages mobility anchor allocation for the network. Previous techniques, such as the use of a PIPMM message, may be used in some cases.

User Equipment (UE) is disclosed herein. The UE may comprise hardware processing circuitry configured to receive, as part of a communication session with a Port Control Protocol (PCP) server, first portion of video content for use by an application during a first time period. The first portion may be received from a first mobility anchor. The hardware processing circuitry may be further configured to send, for reception at the PCP server, a PCP update message that includes one or more mobility status parameters associated with the communication session. The hardware processing circuitry may be further configured to receive, as part of the communication session, a second portion of the video content for use by the application during a second time period. The second portion may be received from a second mobility anchor that is based at least partly on the mobility status parameters included in the PCP update message. In some embodiments, the first and second portions of the video content may be received from the PCP server, the first and second mobility anchors may operate as relays for the PCP server, and the application may be supported by a PCP client at the UE. In some embodiments, the UE may further comprise one or more antennas configured to receive the first and second portions of the video content and further configured to send the PCP update message. The one or more antennas may be further configured to receive and transmit other signals, packets, and content to and from the first mobility anchor, the second mobility anchor, and other components.

In some embodiments, the PCP update message may include a PCP PEER message with a Preferred Internet Protocol Prefix and Mobility (PIPPM) option. In some embodiments, the mobility status parameters may include an Internet Protocol (IP) prefix determined at the UE and the determined IP prefix may be associated with the second mobility anchor. In some embodiments, the determination of the IP prefix included in the PCP update message may be based at least partly on a historical usage of IP prefixes by the UE as part of other communication sessions. In some embodiments, the mobility status parameters may further include an IP continuity parameter that indicates support for reception from the second mobility anchor according to a second IP prefix different from a first IP prefix used for reception from the first mobility anchor. The hardware processing circuitry may be further configured to receive the second IP prefix from the first mobility anchor. In some embodiments, the first mobility anchor may be supported by a first Evolved Node-B (eNB) and the second mobility anchor may be supported by a second eNB.

In some embodiments, the first portion of the video content may be formatted according to a first encoded bit rate and the second portion of the video content may be formatted according to a second encoded bit rate. In some embodiments, the second encoded bit rate may be reduced in comparison to the first portion of the video content and the reduction in the encoded bit rate may be based at least partly on the determined IP prefix included in the PCP update message.

A method of receiving video content at a User Equipment (UT) as part of a communication session is also disclosed herein. The method may include receiving a first portion of the video content from a Port Control Protocol (PCP) server for use in an application supported by a PCP client. The first portion may be received according to a first Internet Protocol (IP) prefix. The method may further include sending, for reception at the PCP server, a PCP update message that includes a preferred prefix for the communication session. The method may further include receiving a setup message from the PCP server that indicates connectivity with the PCP server according to the preferred IP prefix as part of the communication session. The method may further include receiving a second portion of the video content from the PCP server for use in the application. The second portion may be received according to the preferred IP prefix. In some embodiments, the preferred IP prefix may be based at least partly on a historical usage frequency of the preferred IP prefix by the UE in other communication sessions, and the preferred IP prefix may be different from the first prefix.

In some embodiments, the first portion may be received from a first mobility anchor operating as a relay for the PCP server and the first IP prefix may be reserved for the first mobility anchor. In some embodiments, the second portion may be received from a second mobility anchor operating as a relay for the PCP server and the preferred IP prefix may be reserved for the second mobility anchor. In some embodiments, the first portion and second portion of the video content may enable video playback of the video content by the application. In some embodiments, the PCP update message may include a PCP PEER message with a Preferred Internet Protocol Prefix and Mobility (PIPPM) option.

A non-transitory computer-readable storage medium that stores instructions for execution by one or more processors to perform operations for receiving content for an application is also disclosed herein. The operations may configure the one or more processors to receive, as part of a communication session with a Port Control Protocol (PCP) server, a first portion of video content for use by an application during a first time period. The first portion may be received from a first mobility anchor. The operations may configure the one or more processors to send, for reception at the PCP server, a PCP update message that includes one or more mobility status parameters associated with the communication session. The operations may configure the one or more processors to receive, as part of the communication session, a second portion of the video content for use by the application during a second time period. The second portion may be received from a second mobility anchor that is based at least partly on the mobility status parameters included in the PCP update message. In some embodiments, the first and second mobility anchors may operate as relays for communication of the first and second portions of the video content on behalf of the PCP server. In some embodiments, the PCP update message may include a PCP PEER message with a Preferred Internet Protocol Prefix and Mobility (PIPPM) option. In some embodiments, the mobility status parameters may include a preferred Internet Protocol (IP) prefix that is associated with the second mobility anchor and may be further associated with a historical usage frequency of IP prefixes by the UE in other communication sessions.

In some other embodiments, a UE may comprise hardware processing circuitry configured to receive, from a Port Control Protocol (PCP) server, a first portion of video content for use by an application during a first time period. The first portion may be formatted according to a first display format. The hardware processing circuitry may be further configured to send a PCP update message for reception at the PCP server. The PCP update message may include one or more device operation parameters associated with the UE. The hardware processing circuitry may be further configured to receive, from the PCP server, a second portion of the video content for use by the application during a second time period. The second portion may be formatted according to a second display format, and the second display format may be based at least partly on the device operation parameters included in the PCP update message.

In some embodiments, the first portion and the second portion of the video content may be received indirectly from the PCP server through an Evolved Node-B (eNB) operating as a relay. In some embodiments, the UE may support a PCP client and the application may operate as part of the PCP client. In some embodiments, the first portion and the second portion of the video content may enable a streaming video playback by the application during a time period that includes the first and second time periods. In some embodiments, the first portion of the video content may be formatted according to a first brightness level and the second portion of the video content may be formatted according to a second, different brightness level. In some embodiments, the first portion of the video content may be formatted according to a first encoded data rate value and the second portion of the video content may be formatted according to a second, different encoded data rate value. In some embodiments, the application may be a multimedia application that supports video playback of the video content.

In some embodiments, the PCP update message may include a PCP PEER request that includes a user application feedback request. In some embodiments, the device operation parameters may include a screen resolution parameter or a screen size parameter. In some embodiments, the device operation parameters may include a battery level status, an environmental noise level or an environmental light level. In some embodiments, the device operation parameters may include a UE location or an indicator of user motion. In some embodiments, the PCP update message may include a PCP PEER request that includes a Preferred Internet Protocol Prefix and Mobility (PIPPM) request. The PIPPM request may include a preferred Internet Protocol (IP) prefix for the UE. In some embodiments, a video quality level of the second portion of the video content may be different than a video quality level of the first portion of the video content. In some embodiments, the PCP update message may be sent at least partly in response to a change, at the UE, of one or more of the device operation parameters included in the PCP update message.

A method of receiving content for an application is also disclosed herein. The method may include transmitting upon Control Protocol (PCP) initialization message that includes initial values for one or more device operation parameters related to usage of the application at a device. The method may further include receiving a first portion of video content for the application in a first format. The first format may be based at least partly on the initial values for the device operation parameters. The method may further include transmitting a PCP update message that includes one or more updated values for the device operation parameters. The method may further include receiving a second portion of the video content for the application in a second format. The second format may be based at least partly on the updated values for the device operation parameters.

In some embodiments, the first and second portions of the video content may be received from a PCP server. The application may operate as part of a PCP client associated with the PCP server. The PCP initialization message and the PCP update message may each include a PCP PEER request that includes a user application feedback request. In some embodiments, the device operation parameters may include a battery level status, an environmental noise level or an environmental light level. In some embodiments, the application may be a video application, the first portion of the video content may be formatted according to a first brightness playback level, and the second portion of the video content may be formatted according to a second, different brightness playback level. In some embodiments, the application may be a video application, the first portion of the video content may be formatted according to a first encoded data rate value, and the second portion of the video content may be formatted according to a second, different encoded data rate value.

A Port Control Protocol (PCP) server to support an application at a PCP client is also disclosed herein. The PCP server may comprise hardware processing circuitry configured to send a first portion of video content in a first format to the PCP client for use by the application. The hardware processing circuitry may be further configured to receive a PCP update message that includes one or more device operation parameters associated with a User Equipment ((UE) that supports the PCP client. The hardware processing circuitry may be further configured to send a second portion of the video content in a second format to the PCP client for use by the application. In some embodiments, the second format may be determined for the second portion of the video content based on the received device operation parameters. In some embodiments, the first portion and the second portion of the video content may be sent to an Evolved Node-B (eNB) operating in a 3GPP network for forwarding to the UE. In some embodiments, the device operation parameters may include a screen resolution parameter or a screen size parameter. In some embodiments, the device operation parameters may include a battery level status, an environmental noise level or an environmental light level.

The hardware processing circuitry may be further configured to forward, to an application server, one or more of the device operation parameters included in the received PCP update message. The hardware processing circuitry may be further configured to receive, from the application server, a PCP support message that indicates application support for the one or more device operation parameters. In some embodiments, the PCP update message may be a PCP PEER request that includes a user application feedback request and the PCP support message may be a PCP PEER request that includes a user application feedback response. The hardware processing circuitry may be further configured to receive the first portion and the second portion of the video content from the application server for sending to the UE.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) comprising:
a memory; and
hardware processing circuitry in communication with the memory and configured to:
receive, as part of a communication session with a Port Control Protocol (PCP) server, a first portion of video content for use by an application during a first time period, wherein the first portion is received from a first mobility anchor and the PCP server stores the video content and receives feedback from the application and an application server that provides the video content;
send, for reception at the PCP server, a PCP update message that includes one or more mobility status parameters associated with the communication session; and
receive, as part of the communication session, a second portion of the video content for use by the application during a second time period, wherein the second portion is received from a second mobility anchor that is based at least partly on the mobility status parameters included in the PCP update message.

2. The UE according to claim 1, wherein:
the first and second portions of the video content are received from the PCP server;
the first and second mobility anchors operate as relays for the PCP server; and
the application is supported by a PCP client at the UE.

3. The UE according to claim 1, wherein:
the PCP update message includes a PCP PEER message with a Preferred Internet Protocol Prefix and Mobility (PIPPM) option;
the mobility status parameters include an Internet Protocol (IP) prefix determined at the UE; and
the determined IP prefix is associated with the second mobility anchor.

4. The UE according to claim 3, wherein the determination of the IP prefix included in the PCP update message is based at least partly on a historical usage of IP prefixes by the UE as part of other communication sessions.

5. The UE according to claim 3, wherein the mobility status parameters further include an IP continuity parameter that indicates support for reception from the second mobility anchor according to a second IP prefix different from a first IP prefix used for reception from the first mobility anchor.

6. The UE according to claim 5, the hardware processing circuitry further configured to receive the second IP prefix from the first mobility anchor.

7. The UE according to claim 1, wherein the first mobility anchor is supported by a first Evolved Node-B (eNB) and the second mobility anchor is supported by a second eNB.

8. The UE according to claim 2, wherein the first portion of the video content is formatted according to a first encoded bit rate and the second portion of the video content is formatted according to a second encoded bit rate, and wherein the second encoded bit rate is reduced in comparison to the first portion of the video content and the reduction is based at least partly on the determined IP prefix included in the PCP update message.

9. The UE according to claim 2, the UE further comprising one or more antennas configured to receive the first and second portions of the video content and further configured to send the PCP update message.

10. A method of receiving video content at a User Equipment (UE) as part of a communication session, the method comprising:
receiving a first portion of the video content from a Port Control Protocol (PCP) server for use in an application supported by a PCP client, the first portion received according to a first Internet Protocol (IP) prefix and the PCP server storing the video content and receiving feedback from the application and an application server that provides the video content;
sending, for reception at the PCP server, a PCP update message that includes a preferred IP prefix for the communication session;

receiving a setup message from the PCP server that indicates connectivity with the PCP server according to the preferred IP prefix as part of the communication session;

wherein the preferred IP prefix is based at least partly on a historical usage frequency of the preferred IP prefix by the UE in other communication sessions, and the preferred IP prefix is different from the first IP prefix.

11. The method according to claim 10, wherein:
the first portion is received from a first mobility anchor operating as a relay for the PCP server and the first IP prefix is reserved for the first mobility anchor;
the method further comprises receiving a second portion of the video content from the PCP server for use in the application, the second portion received according to the preferred IP prefix;
the second portion is received from a second mobility anchor operating as a relay for the PCP server and the preferred IP prefix is reserved for the second mobility anchor; and
the first portion and second portion of the video content enable video playback of the video content by the application.

12. The method according to claim 11, wherein the PCP update message includes a PCP PEER message with a Preferred Internet Protocol Prefix and Mobility (PIPPM) option.

13. A non-transitory computer-readable storage medium that stores instructions for execution by one or more processors to perform operations for receiving content for an application, the operations to configure the one or more processors to:
receive, as part of a communication session with a Port Control Protocol (PCP) server, a first portion of video content for use by an application during a first time period, wherein the first portion is received from a first mobility anchor and the PCP server stores the video content and receives feedback from the application and an application server that provides the video content;
send, for reception at the PCP server, a PCP update message that includes one or more mobility status parameters associated with the communication session; and
receive, as part of the communication session, a second portion of the video content for use by the application during a second time period, wherein the second portion is received from a second mobility anchor that is based at least partly on the mobility status parameters included in the PCP update message.

14. The non-transitory computer-readable storage medium according to claim 13, wherein:
the first and second mobility anchors operate as relays for communication of the first and second portions of the video content on behalf of the PCP server;
the PCP update message includes a PCP PEER message with a Preferred Internet Protocol Prefix and Mobility (PIPPM) option; and
the mobility status parameters include a preferred Internet Protocol (IP) prefix that is associated with the second mobility anchor and is further associated with a historical usage frequency of IP prefixes by the UE in other communication sessions.

15. User Equipment (UE) comprising:
a memory; and
hardware processing circuitry in communication with the memory and configured to:
receive, from a Port Control Protocol (PCP) server, a first portion of video content for use by an application during a first time period, wherein the PCP server stores the video content and receives feedback from the application and an application server that provides the video content and the first portion is at least one of:
received from a first mobility anchor that operates as a first relay for communication of the first portion of the video content on behalf of the PCP server, or
formatted according to a first display format;
send a PCP update message for reception at the PCP server, wherein the PCP update message includes at least one of one or more device operation parameters associated with the UE or one or more mobility status parameters associated with a communication session; and
receive, from the PCP server, a second portion of the video content for use by the application during a second time period, wherein the second portion is at least one of:
received from a second mobility anchor that is based at least partly on the one or more mobility status parameters included in the PCP update message and that operates as a second relay for communication of the second portion of the video content on behalf of the PCP server, or
formatted according to a second display format based at least partly on the device operation parameters included in the PCP update message.

* * * * *

UNITED STATES PATENT AND TRADEMARK OFFICE
CERTIFICATE OF CORRECTION

| | | |
|---|---|---|
| PATENT NO. | : 9,554,305 B2 | Page 1 of 1 |
| APPLICATION NO. | : 14/659655 | |
| DATED | : January 24, 2017 | |
| INVENTOR(S) | : Moustafa et al. | |

It is certified that error appears in the above-identified patent and that said Letters Patent is hereby corrected as shown below:

On the Title Page

Item (57), "Abstract", Column 2, Line 13, delete "referred" and insert --preferred-- therefor Item (57), "Abstract", Column 2, Line 14, after "PCP", delete "date"

Signed and Sealed this
Twenty-first Day of April, 2020

Andrei Iancu
*Director of the United States Patent and Trademark Office*